(12) United States Patent
Roeder et al.

(10) Patent No.: US 7,639,142 B2
(45) Date of Patent: Dec. 29, 2009

(54) SYSTEMS AND METHODS FOR ORDER-PICKING

(75) Inventors: William H. Roeder, Norcross, GA (US); Donald L. Runyon, Duluth, GA (US); Richard W. Sorenson, Jr., Atlanta, GA (US); Michael Sayre Clott, Marietta, GA (US)

(73) Assignee: EMS Technologies, Inc., Norcross, GA (US)

( * ) Notice: Subject to any disclaimer, the term of this patent is extended or adjusted under 35 U.S.C. 154(b) by 470 days.

(21) Appl. No.: 11/433,564

(22) Filed: May 15, 2006

(65) Prior Publication Data

US 2006/0255951 A1    Nov. 16, 2006

Related U.S. Application Data

(60) Provisional application No. 60/680,925, filed on May 13, 2005, provisional application No. 60/718,947, filed on Sep. 20, 2005.

(51) Int. Cl.
*G08B 13/14* (2006.01)

(52) U.S. Cl. ............... 340/572.4; 235/385; 340/568.5; 340/572.7; 340/666; 343/713; 705/28

(58) Field of Classification Search .............. 340/572.1, 340/572.4, 572.7, 568.5, 666; 705/28; 235/385; 343/713, 757
See application file for complete search history.

(56) References Cited

U.S. PATENT DOCUMENTS

| | | | |
|---|---|---|---|
| 4,771,288 A | 9/1988 | Johnson | |
| 5,604,485 A | 2/1997 | Lauro et al. | |
| 5,608,417 A | 3/1997 | de Vall | |
| 5,729,697 A * | 3/1998 | Schkolnick et al. | 235/383 |
| 6,057,765 A | 5/2000 | Jones et al. | |
| 6,166,638 A | 12/2000 | Brady et al. | |
| 6,332,098 B2 * | 12/2001 | Ross et al. | 700/226 |
| 6,496,806 B1 | 12/2002 | Horwitz et al. | |
| 6,600,418 B2 | 7/2003 | Sainati et al. | |
| 6,669,089 B2 * | 12/2003 | Cybulski et al. | 235/385 |
| 6,703,935 B1 * | 3/2004 | Chung et al. | 340/572.7 |
| 6,750,771 B1 * | 6/2004 | Brand | 340/572.7 |
| 6,788,204 B1 | 9/2004 | Ianelli et al. | |
| 6,809,703 B2 | 10/2004 | Serra | |
| 7,036,734 B2 | 5/2006 | Baker | |
| 7,121,457 B2 | 10/2006 | Michal, III | |
| 7,151,979 B2 | 12/2006 | Andersen et al. | |
| 7,155,304 B1 | 12/2006 | Charych | |
| 7,221,269 B2 | 5/2007 | Onderko et al. | |
| 7,233,241 B2 | 6/2007 | Overhultz et al. | |

(Continued)

FOREIGN PATENT DOCUMENTS

NL    9401836    6/1996

*Primary Examiner*—Thomas J Mullen
(74) *Attorney, Agent, or Firm*—Hogan & Hartson, LLP

(57) ABSTRACT

In one exemplary embodiment in accordance with the invention, an order-picking system includes a picking cart having a radio frequency (RF) antenna arranged above an object-stacking surface of the picking cart. The order-picking system further includes a radio frequency identification (RFID) tag reader coupled to the RF antenna. The RFID tag reader is configured to identify a first RFID tag attached to a first tagged object placed on the picking cart and further configured to eliminate identification of a second RFID tag attached to a second tagged object located outside a perimeter of the object-stacking surface of the picking cart.

37 Claims, 16 Drawing Sheets

U.S. PATENT DOCUMENTS

| | | |
|---|---|---|
| 7,236,851 B2 | 6/2007 | Charych |
| 7,243,476 B2 | 7/2007 | Schneider |
| 7,339,541 B2 | 3/2008 | Schadler |
| 2002/0130817 A1 | 9/2002 | Forster et al. |
| 2004/0102870 A1 | 5/2004 | Andersen et al. |
| 2005/0052281 A1* | 3/2005 | Bann .................... 340/539.13 |
| 2005/0076816 A1* | 4/2005 | Nakano .................... 108/51.11 |
| 2005/0200457 A1 | 9/2005 | Bridgelall et al. |
| 2006/0058913 A1 | 3/2006 | Andersen et al. |
| 2006/0132312 A1 | 6/2006 | Tavormina |
| 2006/0208893 A1* | 9/2006 | Anson et al. .............. 340/572.1 |
| 2006/0220872 A1 | 10/2006 | Brown et al. |
| 2006/0287760 A1 | 12/2006 | Charych |

\* cited by examiner

| Seq # | RFID int. # 1 | RFID int. # 2 | RFID int. # 3 | RFID int. # 4 | RFID int. # 5 | ... | RFID int. # n | RFID int. # (n+1) | Action taken |
|---|---|---|---|---|---|---|---|---|---|
| 1 | Tag 1 responds | Tag 1 responds | Tag 1 responds | Tag 1 responds | Tag 1 responds | ... | Tag 1 responds | Tag 1 responds | Store in database, ID code of Tag 1 |
| 2 | Tag 1 responds | Tag 1 responds | Tag 1 responds | Tag 1 responds | Tag 1 responds | ... | Tag 1 responds | Tag 1 does not respond | Store & retain in database, ID code of Tag 1 |
| 3 | Tag 1 responds | Tag 1 responds | Tag 1 does not respond | Tag 1 responds | Tag 1 responds | ... | Tag 1 responds | | Do not store in database, ID code of Tag 1 |
| 4 | Tag 1 responds | Tag 1 responds | Tag 1 does not respond | Tag 1 responds | Tag 1 responds | ... | Tag 1 responds | | Based on majority (e.g. of conf. factor), store in database, ID code of Tag 1 |
| 5 | Tag 1 responds | Tag 1 responds | Tags 1 & 2 respond | Tag 1 responds | Tag 1 responds | ... | Tag 1 responds | | Store in database, ID code of Tag 1 Disregard Tag 2 |
| 6 | Tag 1 responds | Tag 1 responds | Tags 1 & 2 respond | Tag 1 responds | Tags 1 & 3 respond | ... | Tag 1 responds | | Store in database, ID code of Tag 1 Disregard Tags 2 & 3 |

FIG. 18

SYSTEMS AND METHODS FOR ORDER-PICKING

CROSS REFERENCE TO RELATED APPLICATIONS

This application claims priority under 35 U.S.C. § 119(e) from U.S. Provisional Patent Application Nos. 60/680,925, filed on May 13, 2005, and 60/718,947, filed on Sep. 20, 2005, both of which are incorporated herein by reference.

STATEMENT REGARDING SPONSORED RESEARCH OR DEVELOPMENT

Not Applicable.

REFERENCE TO SEQUENCE LISTING

Not Applicable.

DESCRIPTION OF THE RELATED ART

One among various processes associated with order fulfillment is termed "order-picking." Order-picking generally refers to the process wherein a person uses an inventory list to identify and pick up multiple objects that are stored at various locations of a store or a warehouse. The process may be described in further detail using a warehouse order-picking process as an example.

In the warehouse, an operator typically uses a suitable vehicle, such as a pallet truck or a lift truck, to drive down various aisles between shelves, stopping at one or more shelves to pick up objects identified in the inventory list. This type of order-picking may be improved by using certain technologies such as bar code scanning and remote inventory control.

One such technology that is gaining popularity in various warehouse applications is radio frequency identification (RFID) technology. Though RFID technology has been successfully incorporated into certain warehouse applications, it is unfortunate that there are several other warehouse applications in which it has met with limited success or has proven ineffective.

Specifically, RFID technology has met with limited success in order-picking applications. Many of the proposed solutions suffer from one or more handicaps. For example, in a first RFID system implementation for order-picking, a vehicle carrying tagged objects that have been picked off shelves passes through a portal on which is mounted an RFID tag reader. This portal is generally placed at a convenient location away from the shelves. The portal-mounted tag reader attempts to cumulatively read the RFID tags attached to the tagged objects in a process referred to as "x-raying."

As is known in the art, achieving a successful RFID communication link between an RFID tag reader and an RFID tag depends on successfully establishing a bidirectional communication link between the RFID tag reader and the tag. In certain cases, the RFID tag is a passive device that obtains energy for its operation from the RF signal transmitted by the RFID tag reader. Unfortunately, when tagged objects, which are typically inhomogeneous in the nature of their contents, are stacked together, the RF energy may be hampered from reaching some of the passive RFID tags, thereby preventing successful tag operation. In certain cases, RF energy is completely blocked from reaching some RFID tags when the tagged objects are encased inside RF-unfriendly material such as metal boxes or aluminum foil. As a result of this shortcoming, the x-raying process fails to successfully and consistently identify all the individual RFID tags all the time.

Additionally, even if the RFID tag reader is able to successfully establish RFID communication with each and every RFID tag, the x-raying process still proves operationally inefficient when an object that is not on the order-picking inventory list has been inadvertently placed on the vehicle. Discovery of this wrongfully-picked object by the portal-mounted RFID system leads to various undesirable manual operations such as dismantling of the stack, accurate identification and isolation of the individual object, identification of the shelf from which the object was picked, re-stocking of the object on the shelf, and re-verification of the rectified stack one more time. Obviously, such manual operations lead to loss of time and money.

In an attempt to rectify some of the shortcomings of the system described above, an alternative RFID system has been used in an attempt to accurately read RFID tags while simultaneously eliminating some of the manual operations related to erroneous picks. In this alternative system, an RFID tag reader is mounted at a suitable location close to one or more shelves on which the objects are stored. The RFID tag reader attempts to read each tag as each individual object is carried by the operator from the shelf to the vehicle. Unfortunately, this method often generates undesirable tag readings because the RFID tag reader not only reads the tag on the picked object but also generates readings from tags on other objects that have to remain shelved on shelves nearby. Furthermore, this system suffers form the additional handicap that multiple RFID tag readers may be necessary to provide adequate coverage over a large number of shelves.

Consequently, in yet another implementation, a single RFID tag reader is mounted on the vehicle itself. This vehicle-mounted RFID tag reader attempts to read each tag as the tagged object is carried by the operator from the shelf to the vehicle. Unfortunately, this implementation also proves inadequate because of undesirable reading of tags on unpicked objects located outside the vehicle.

One proposed solution to rectify this shortcoming involves the use of an RF antenna having a radiation pattern that is narrowly directed towards the vehicle platform on which the picked objects are loaded. Unfortunately, the radiation pattern, coupled with other limitations associated with prior art RF antennas, has generally proven inadequate in eliminating undesirable reads of RFID tags located outside the vehicle. Furthermore, this solution still suffers from the tag reading problems encountered when inhomogeneous objects are stacked together, more so when the objects are encased inside RF-unfriendly material.

In summary, based on the above-mentioned handicaps of existing RFID systems, an unaddressed need exists in the industry to overcome such deficiencies and inadequacies.

SUMMARY

In one exemplary embodiment in accordance with the invention, an order-picking system includes a picking cart having a radio frequency (RF) antenna arranged above an object-stacking surface of the picking cart. The order-picking system further includes a radio frequency identification (RFID) tag reader coupled to the RF antenna. The RFID tag reader is configured to identify a first RFID tag attached to a first tagged object placed on the picking cart and further configured to eliminate identification of a second RFID tag attached to a second tagged object located outside a perimeter of the object-stacking surface of the picking cart.

Clearly, some alternative embodiments may exhibit advantages and features in addition to, or in lieu of, those mentioned above. It is intended that all such alternative embodiments be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

FIG. 18 is another chart showing alternative conditions when implementing various embodiments of order picking methods in accordance with the invention.

DETAILED DESCRIPTION

Figure 1:
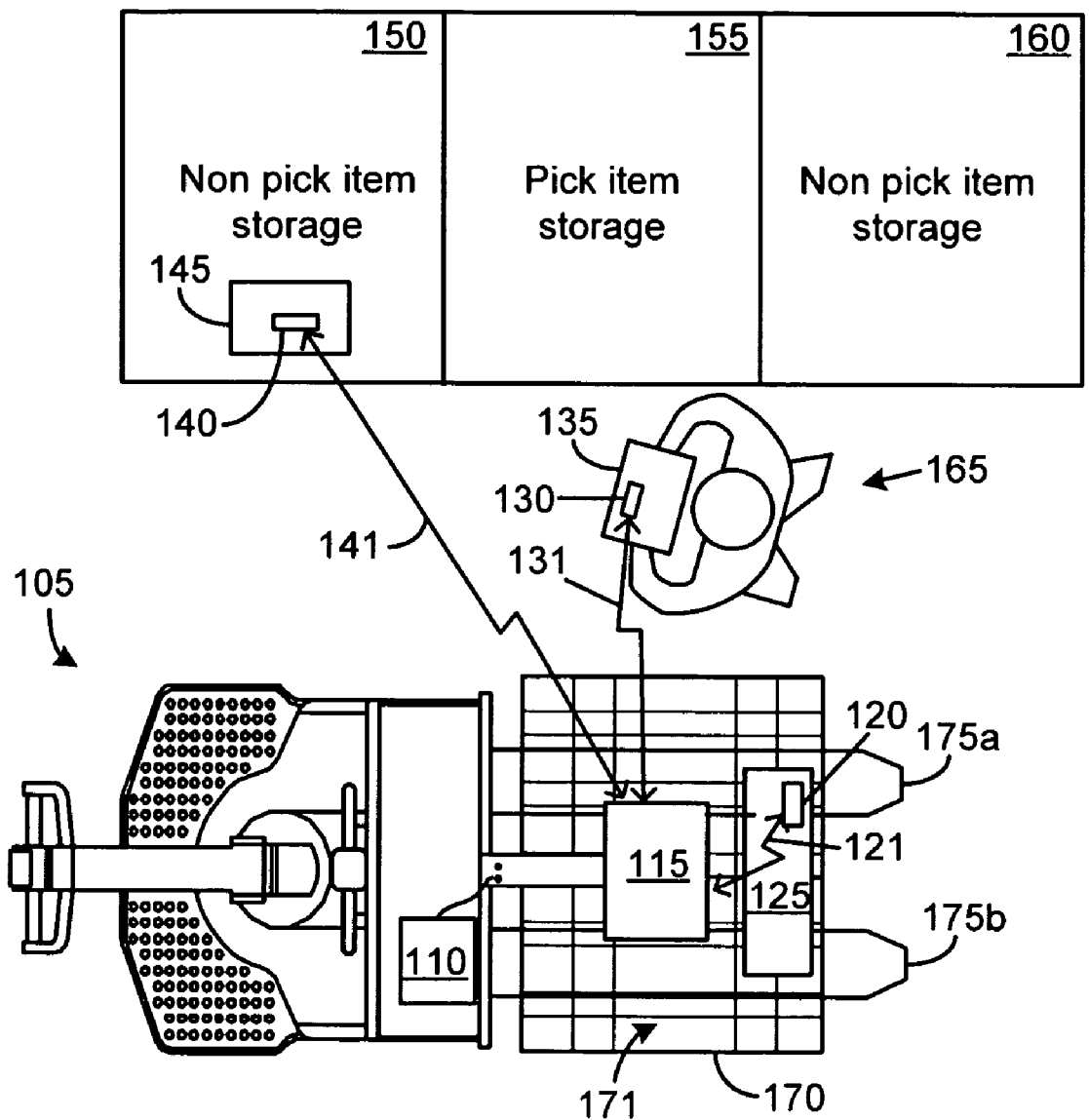
FIG. 1 shows a top view of a picking cart on which is mounted a few components of an exemplary RFID system used to implement order-picking in accordance with the invention.

The various embodiments described below in accordance with the invention generally describe alternative features of a radio frequency identification (RFID) system mounted on a picking cart and further describe alternative methods for order picking.

It will be understood that various terms such as "picking cart," "ID code," and "order-picking" that are used in this disclosure should be interpreted in a broad sense and are not intended to be limited by the exemplary embodiments described herein.

As a general guideline, the term "picking cart" refers to any vehicle that is used to transport picked items. Some non-exhaustive examples of picking carts include a lift truck, a motorized pallet truck, a hand pallet truck, a shopping cart, a trailer, and a flatbed attached to a motorized vehicle.

The term "ID code," which is used herein interchangeably with the term "ID data," is intended to be interpreted as a generic term indicative of various types of identification data stored in an RFID tag.

Furthermore, the term "order-picking" in general, refers to a process wherein a person uses a picking cart and an inventory list to identify and pick up multiple objects stored at various locations. For purposes of illustration, in one of several examples of order-picking, a warehouse employee carries out order-picking by using an inventory list to identify and pick up various items stored in a warehouse. This process is known in industry by various terms such as "piece-picking," "case-picking," and "pallet-picking," the terms being generally descriptive of the type of object packaging and storage.

In piece-picking for example, individual items are picked from fixed locations on shelves, flow racks, carousels, conveyors, or pallet racks. Piece-picking may be implemented using various industry-wide procedures such as batch picking, multi-order picking, zone picking, and wave picking.

In case-picking, which typically involves less-diverse products than those that are involved in piece-picking, products are packed inside cases that are stored on one or more pallet racks or in bulk on floor locations. The warehouse employee uses a picking cart, such as a hand pallet jack or a motorized pallet truck, for example, to identify and pick cases of products listed on an inventory list.

In pallet-picking, which typically involves one or more type of products or cases stacked on pallets, an individual pallet is identified from the inventory list, irrespective of the products stacked on the pallet, and picked up by the warehouse employee using a picking cart such as a lift truck.

As a further example of order-picking, a consumer uses a shopping cart and a shopping list to identify and pick up various objects stored on various shelves, racks, and floor locations of a store. All such object picking variants described above are incorporated herein in the scope of this disclosure.

Various aspects of the invention will be better understood in light of the description provided below and the accompanying figures that illustrate a few exemplary embodiments in accordance with the invention.

FIG. 1 shows a top view of a picking cart, which is, in this exemplary embodiment, a forklift 105, on which is mounted an RFID tag reader 110 coupled to an RF antenna 115. RFID tag reader 110 and RF antenna 115 are parts of an exemplary RFID system used to implement order-picking in accordance with the invention. A picked object 125 to which is attached an RFID tag 120, is shown placed on an object-stacking surface 171 of a pallet 170 that is mounted on forks 175a and 175b of forklift 105.

A second object 135 to which is attached RFID tag 130 is shown being transferred by a forklift operator 165 from warehouse shelf 155 to object-stacking surface 171 of pallet 170. A third object 145 to which is attached an RFID tag 140, is shown located on a warehouse shelf 150. Object 145, which is defined as being located in a "picking area," is not included in an inventory list (not shown) carried by operator 165 and is consequently excluded from the order-picking.

RFID tag reader 110 communicates wirelessly with RFID tags 140, 130, and 120 via RF communication paths 141, 131, and 121 respectively.

The term "picking area" is used herein in this disclosure to denote various locations in which tagged objects available for picking are stored. Specifically, the picking area is defined as being located external to a perimeter of object-stacking surface 171 on which the picked objects are stacked after being picked by operator 165. Some examples of picking areas include: storage space on shelf 155 containing objects to be picked, storage space on shelves 150 and 160 containing objects that are not included in the inventory list, and a floor area in the vicinity of forklift 105 such as the floor area in which operator 165 is shown standing. In industry-terminology related to warehouse applications, the picking area is often referred to as a "pick front."

Figure 2:
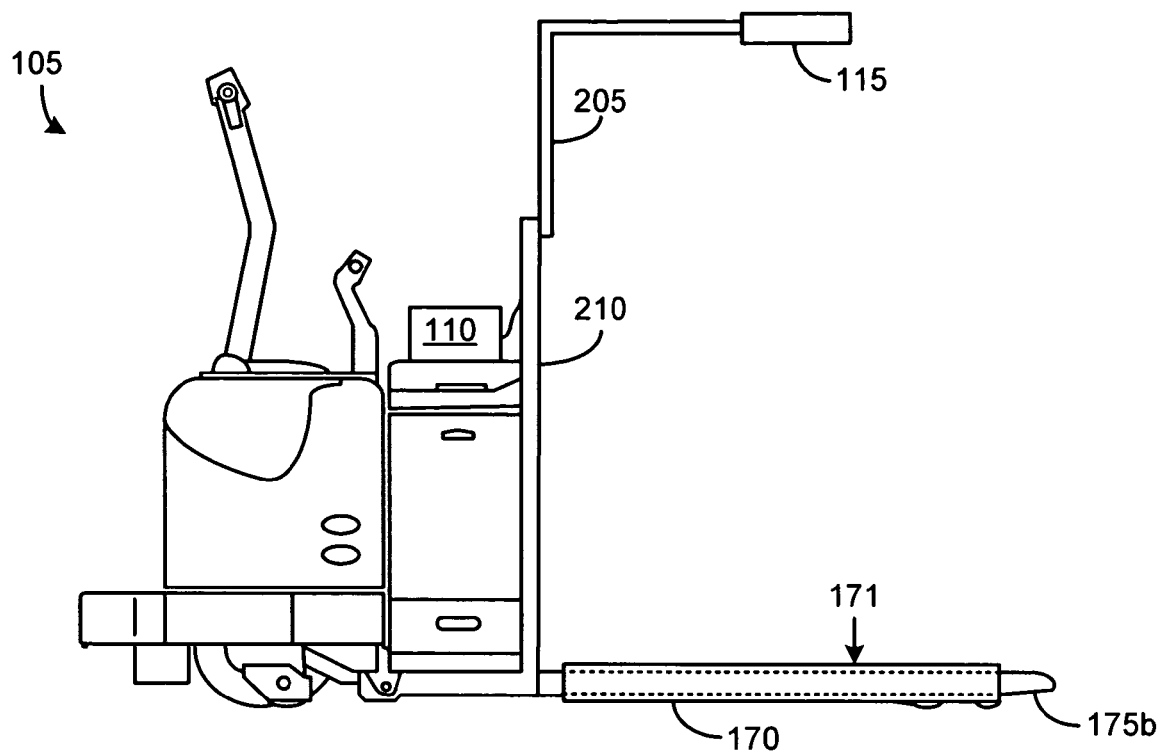
FIG. 2 shows a side view of the picking cart of FIG. 1.

Attention is now drawn to FIG. 2, which shows a side view of picking cart 105. RF antenna 115 is mounted on a mounting arm 205 that is attached to load rest 210 of forklift 105. RF antenna 115 faces downwards such that an antenna radiation pattern of RF antenna 115 is directed towards object-stacking surface 171 of pallet 170. Mounting arm 205 is dimensioned to locate RF antenna 115 at a height H that is selected based on various parameters related to the type of antenna and the mode of operation of RFID tag reader 110 coupled to RF antenna 115. A few exemplary parameters include: antenna operating frequency, antenna radiation characteristics, antenna radiation pattern control, RF transmit power control, and an order-picking algorithm used in RFID tag reader 110. These aspects will be described below in further detail.

Figure 3:
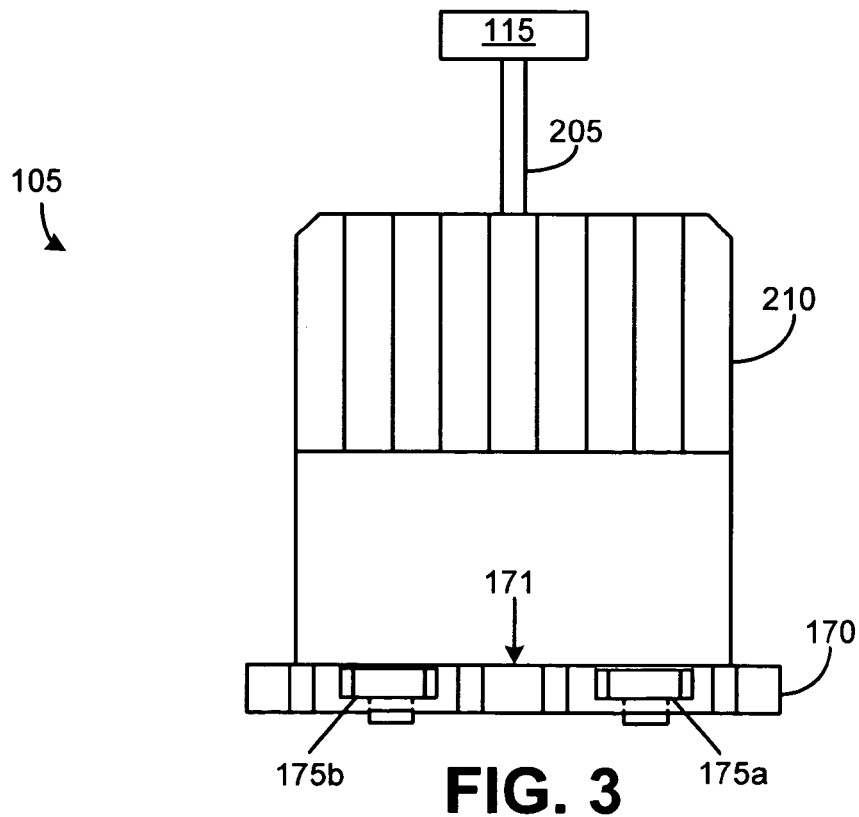
FIG. 3 shows a front view of the picking cart of FIG. 1.

FIG. 3 shows a front view of forklift 105. Forks 175a and 175b of forklift 105 are shown inserted into pallet 170 with object-stacking surface 171 exposed to RF antenna 115. As mentioned above, RF antenna 115 is mounted on mounting arm 205 attached to load rest 210 of forklift 105.

Several exemplary order-picking systems and methods using RFID tag reader 110 and RF antenna 115 mounted on forklift 105 will be described below in further detail. The various alternative embodiments may be broadly categorized as follows:

a) selecting a specific type of RF antenna 115 so as to have a desirable antenna radiation characteristic for facilitating accurate reading of tagged objects placed on forklift 105 while eliminating reading tagged objects located outside forklift 105, b) using RFID tag reader 110 to operate RF antenna 115 in a desired manner such as for providing null RF coverage at selected locations in the picking area, c) using one of several alternative algorithms in RFID tag reader 110 to improve RFID tag reading accuracy and eliminate false reads, and d) using auxiliary components such as a range finder and a weighing system to improve RFID tag reading accuracy and to eliminate false reads.

It will be understood that the above-mentioned alternative embodiments may be used individually or in various alternative combinations for order-picking in accordance with the invention. For example, a weighing system may be used independently in a first embodiment of the order-picking system, while the weighing system may be used in conjunction with an algorithm in a second embodiment of the order-picking system. As a further example, a specific type of RF antenna 115 may be independently used in a third embodiment of the order-picking system, while the specific type of RF antenna 115 may be used together with an algorithm in a fourth embodiment of the order-picking system.

Figure 4A:
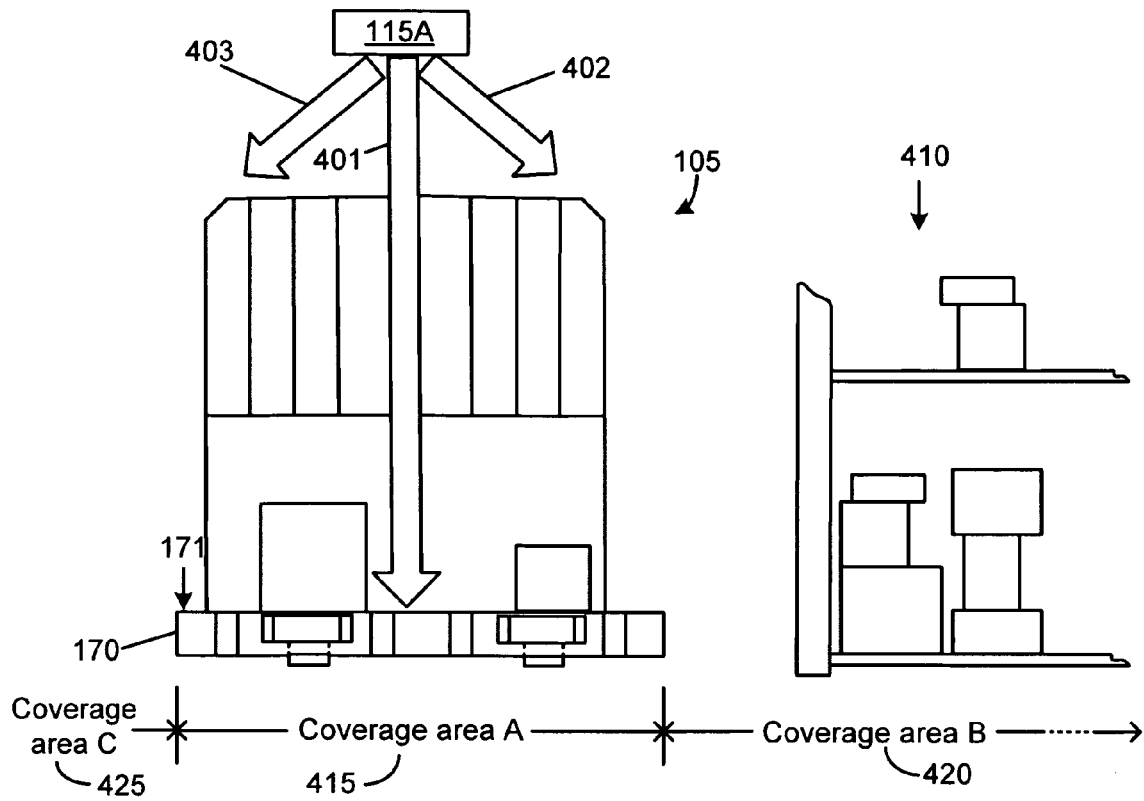
FIG. 4A shows a first exemplary RF antenna that may be used as a part of the order-picking system of FIG. 1 to provide selective RF radiation coverage.

Attention is now drawn to FIG. 4A which shows a first exemplary RF antenna 115A that is selected to provide selective RF radiation coverage. Specifically, in this exemplary embodiment, RF antenna 115A is selected to provide significant RF coverage directed towards object-stacking surface 171 of pallet 170 while suppressing RF coverage in other directions. This selective RF radiation coverage thereby supports effective bidirectional communication between an RFID reader and an RFID tag attached to an object placed on object-stacking surface 171, while suppressing bidirectional communication between the RFID reader and an RFID tag attached to an object located outside object-stacking surface 171. Object-stacking surface 171 of pallet 170 is defined in FIG. 4A as being located in coverage area "A" 415.

It will be understood that RF antenna 115A is used to not only read RFID tags attached to objects placed directly on object-stacking surface 171 but also to read RFID tags attached to objects that may be additionally stacked on top of these objects. All such objects, which are transportable by fork lift 105 from one location to another, are identified herein as being located within a perimeter of object-stacking surface 171 of pallet 170.

In the exemplary embodiment shown in FIG. 4A, RF antenna 115A may be implemented using various alternative types of antennas. As a non-exclusive example, a patch antenna having a main lobe (designated by arrow 401) and two side lobes (designated by arrows 402 and 403) may be used in a first implementation. The main lobe provides RF coverage of object-stacking surface 171 of pallet 170. The side lobes are selected to be weak enough that RF coverage directed towards coverage area "B" 420 and coverage area "C" 425 is suppressed thereby preventing bidirectional communication between the RFID reader and any RFID tags attached to objects located outside object-stacking surface 171. As a result of this selective RF coverage, RFID tags attached to picked objects placed on fork lift 105 are read via RF antenna 115 while RFID tags attached to objects outside fork lift 105, such as the objects placed on a shelf 410 located in coverage area "B," are effectively non-responsive to RFID interrogation signals emitted from RF antenna 115A in the bidirectional communication link.

The efficiency of the RFID tag reading system shown in FIG. 4A may be optionally enhanced by using an order-picking algorithm designed to further eliminate undesirable reads. A few such exemplary algorithms will be described below using other figures.

Figure 4B:
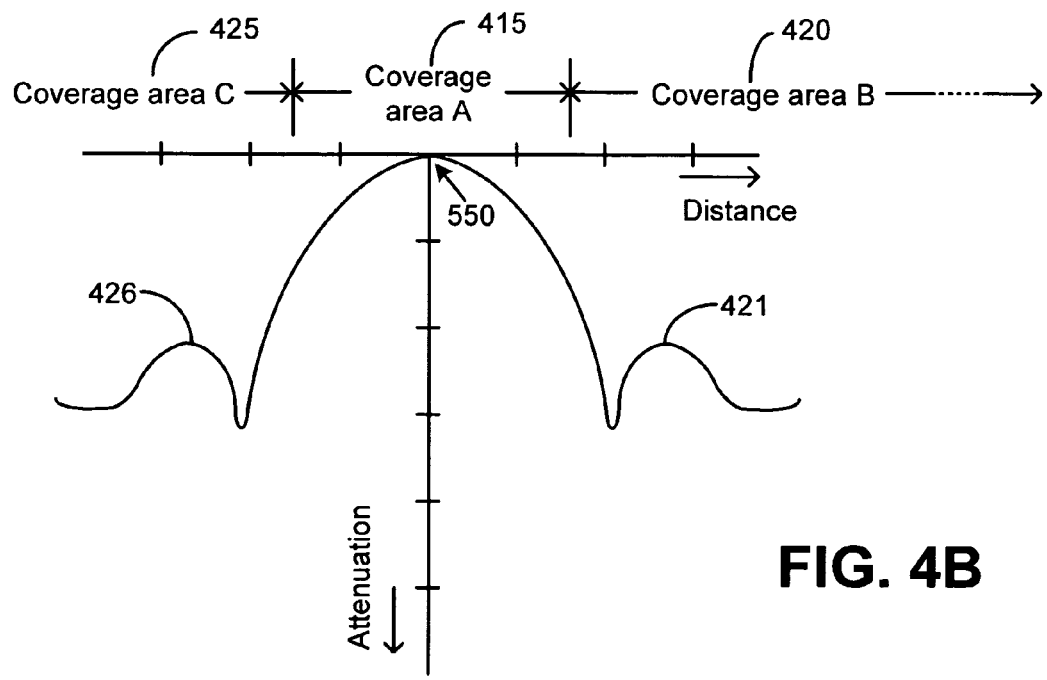
FIG. 4B shows a plot of attenuation versus distance of the antenna of FIG. 4A.

FIG. 4B shows a plot of attenuation versus distance of the antenna 115A of FIG. 4A. The RF signal strength in coverage area "A" 415 is significantly higher than the RF signal strength in coverage areas "B" and "C" as can be inferred from the attenuation plot. The portion of the plot designated by reference numeral 550 corresponds to maximum RF signal strength (vis-à-vis minimum signal attenuation) that is a result of the main lobe being directed towards coverage area "A." In contrast, the portion of the attenuation plot designated by reference numerals 426 and 421, corresponding to side lobes 403 and 402 directed towards coverage areas "C" and "B", respectively, has a much lower RF signal strength (i.e. higher signal attenuation, indicative of RF signal suppression).

Figure 5:
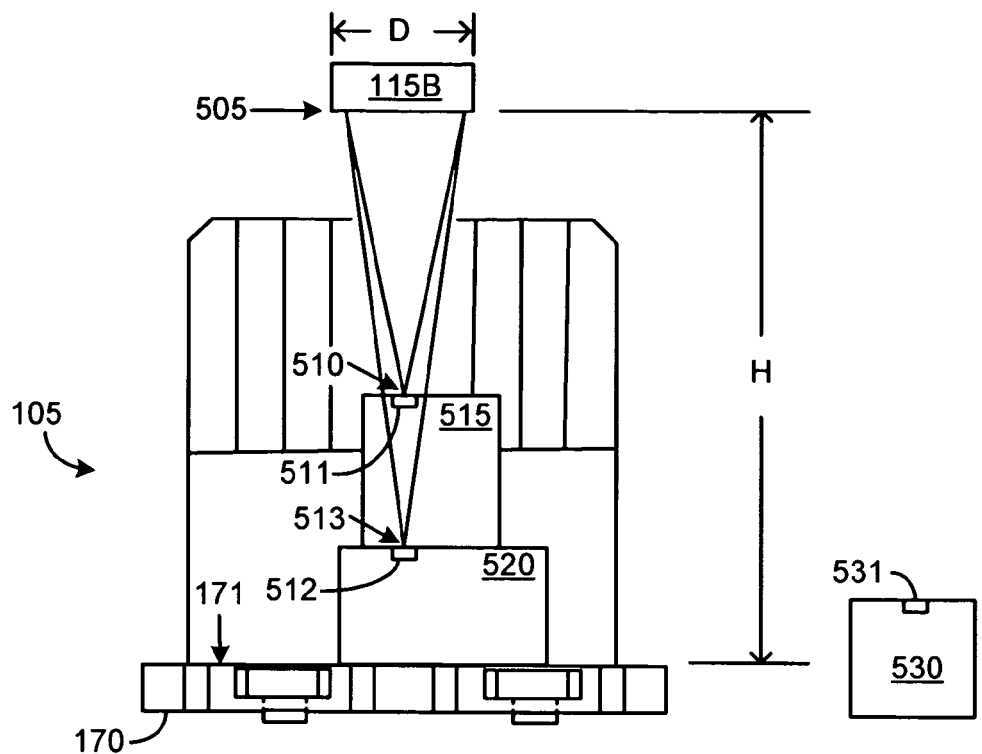
FIG. 5 shows a second exemplary antenna that may be used as a part of the order-picking system of FIG. 1 to provide variable near-field focus.

FIG. 5 shows a second exemplary RF antenna 115B which may be used in an embodiment of an order-picking system in accordance with the invention. In this exemplary embodiment RF antenna 115B is a phased array antenna configured to provide variable near-field focus. The term "near-field" may be generally defined as a distance condition of an antenna 115B where the distance condition is dependent upon an effective aperture measure of the antenna. The distance condition can be defined using a "Rayleigh distance." Within the near-field region the RF energy propagation is more complex than the far-field region and the energy propagation may be generally described as a distribution of energy points in space.

In contrast, the term "far field" may be defined as a region outside the near-field and the energy propagation from the antenna 115B is generally described as emanating from a single point in space. Near-field and far-field of operations are generally understood by persons of ordinary skill in the art and therefore will not be described herein in further detail. In various exemplary embodiments in accordance with the invention, the phased array antenna is configured to operate in a near-field mode of operation, a far-field mode of operation, and in a combination of near-field and far-field modes of operation.

If dimension "D" of RF antenna 115B is the effective aperture dimension of the antenna, the far-field region is generally accepted as lying at distances greater than $2D^2/\lambda$ from RF antenna 115B, where $\lambda$ is the wavelength of operation.

In accordance with one embodiment of this invention, variable near field focus is used to selectively read an individual RFID tag attached to an object placed on a picking cart while eliminating undesirable reads from RFID tags attached to objects outside the cart, (e.g. tag 531 attached to object 530) as well as to other objects that are located on the cart. In other words, a variable near field focus is used to achieve a bidirectional communication link between a RFID reader and a RFID tag 510 when the tagged object is within a near field region of a RFID reader antenna 115B. Attention is drawn once again to FIG. 5 for explaining this aspect of the invention. In this exemplary embodiment, the width "D" of RF antenna 115B is selected to be approximately 4 feet, and height "H" at which RF antenna 115B is located above object-stacking surface 171 of pallet 170 is selected to be approximately between 6 to 8 feet. The operating frequency of RF antenna 115B is approximately centered at 915 MHz, which translates to a wavelength of approximately 1.1 feet. The far field distance criteria for this exemplary embodiment is approximately 29 feet.

In an alternative embodiment where the width "D" of RF antenna 115B is selected to be approximately 2 feet, the far field distance criteria is approximately 7.3 feet.

Near field focusing techniques can be used advantageously when the RFID tag 511, 512 is located within the near field region of a RF antenna 115B. These operating parameters provide near-field focusing ability at any selected point between emitting surface 505 of RF antenna 115B and object-stacking surface 171 of pallet 170.

A tag reader (not shown), such as tag reader 110 of FIG. 1, provides, at a first instant, a control signal to RF antenna 115B for configuring the RF radiation pattern to generate a near field focus at near-field focus point 510 wherein an RFID tag 511 is attached to the top surface of an object 515. The tag reader then provides an RFID interrogation signal, which is transmitted by RF antenna 115B towards near-field focus point 510. The interrogation signal is received by RFID tag 511, which then provides a suitable response. Due to the nature of the near-field focusing, a bidirectional communication link is prevented from being established between the tag reader and RFID tag 512 located away from near-field focus point 510. Additionally, tag 531 attached to object 530 fails to establish a bidirectional communication link with the tag reader, thereby eliminating an undesirable read of tag 531 located outside picking cart 105.

Subsequently, the tag reader may provide a second control signal to RF antenna 115B for configuring the RF radiation pattern to generate a near field focus at near-field focus point 513 wherein another RFID tag 512 is attached to the top surface of another object 520. The tag reader then provides an RFID interrogation signal, which is transmitted by RF antenna 115B towards near-field focus point 513. The interrogation signal is received by RFID tag 512, which then provides a suitable response. In this case, RFID tag 511 is no longer at a near field focus and so a bidirectional communication link with the tag reader is not established. Here again, tag 531 attached to object 530 is unable to establish a bidirectional communication link with the tag reader.

Figure 6:
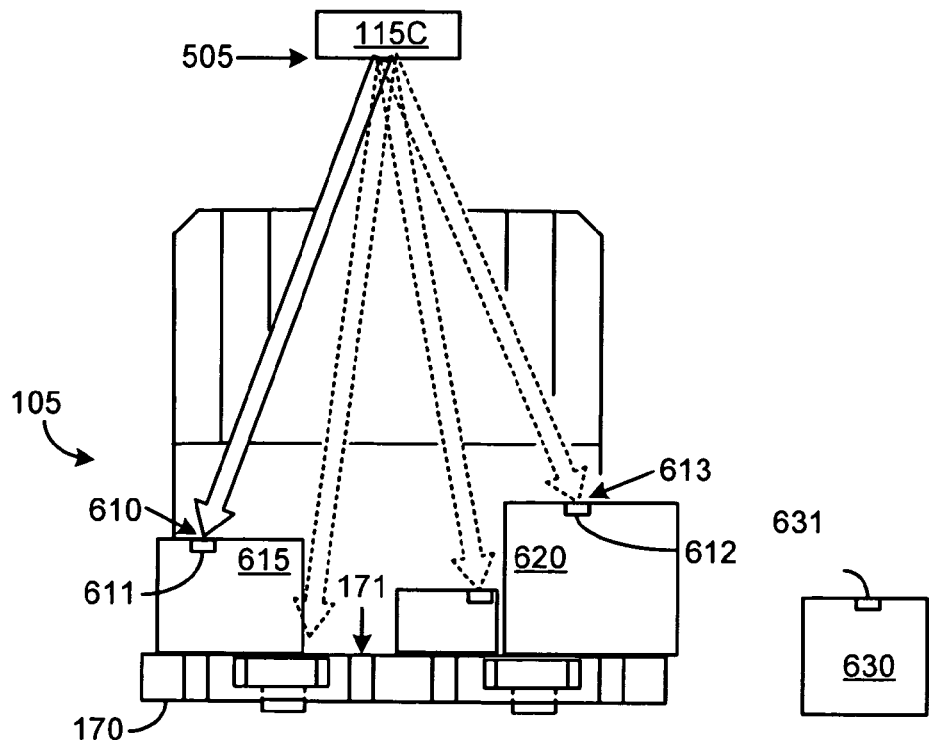
FIG. 6 shows a third exemplary antenna, which may be used as a part of the order-picking system of FIG. 1, the antenna configured to provide a steering mode of operation.

FIG. 6 shows a third exemplary RF antenna 115C which may be used in an embodiment of order-picking system in accordance with the invention. In this exemplary embodiment RF antenna 115C is a phased array antenna configured to provide a steering mode of operation. The steering mode of operation is used to selectively read an individual RFID tag attached to an object placed upon one portion of object-stacking surface 171 of pallet 170 while eliminating an undesirable read from an RFID tag attached to another object located upon a different portion of object-stacking surface 171 as well as an object located outside the cart. RF antenna 115C may be configured for a near field and/or a far-field steering mode of operation.

A tag reader (not shown) such as tag reader 110 of FIG. 1, provides, at a first instant, a control signal to RF antenna 115C for configuring the RF radiation pattern to direct a focused beam, preferably using near-field focus, upon scanning location 610 wherein an RFID tag 611 is attached to the top surface of an object 615. The tag reader then configures RF antenna 115C to transmit an RFID interrogation signal towards scanning location 610. The interrogation signal is received by RFID tag 611, which then provides a suitable response. Due to the nature of the narrowly focused beam, RFID tag 612 which is attached to the top surface of another object 620 located away from scanning location 610, does not achieve bidirectional communications with the tag reader 110. Additionally, tag 631 attached to object 630 does not achieve a bidirectional communication link with the tag reader 110, thereby eliminating an undesirable read of tag 631 located outside picking cart 105.

Subsequently, the tag reader provides a second control signal to RF antenna 115C for steering the RF radiation pattern from scanning location 610 to scanning location 613 wherein RFID tag 612 is located. The tag reader then provides an RFID interrogation signal, which is transmitted by RF antenna 115C towards scanning location 613. The interrogation signal is received by RFID tag 612, which then provides a suitable response and a bidirectional communication link with the tag reader 110 is achieved. In this case, RFID tag 611, which is no longer in the beam path, does not effectively receive the interrogation signal and consequently, does not effectively respond to the interrogation signal. Here again, tag 631 attached to object 630 does not achieve a bidirectional communication link with tag reader 110.

While FIG. 6 shows objects 615 and 620 side by side on object-stacking surface 171, RF antenna 115C can be further configured to read individual RFID tags attached to objects that are located on top of objects 615 and 620. The near-field focusing feature described above using FIG. 5, may be used in conjunction with the steering feature shown in the embodiment of FIG. 6, to read individual RFID tags attached to objects that are located on top of other objects, and, to read any individual RFID tag attached to any individual object located in a stack on object-stacking surface 171.

Figure 7A:
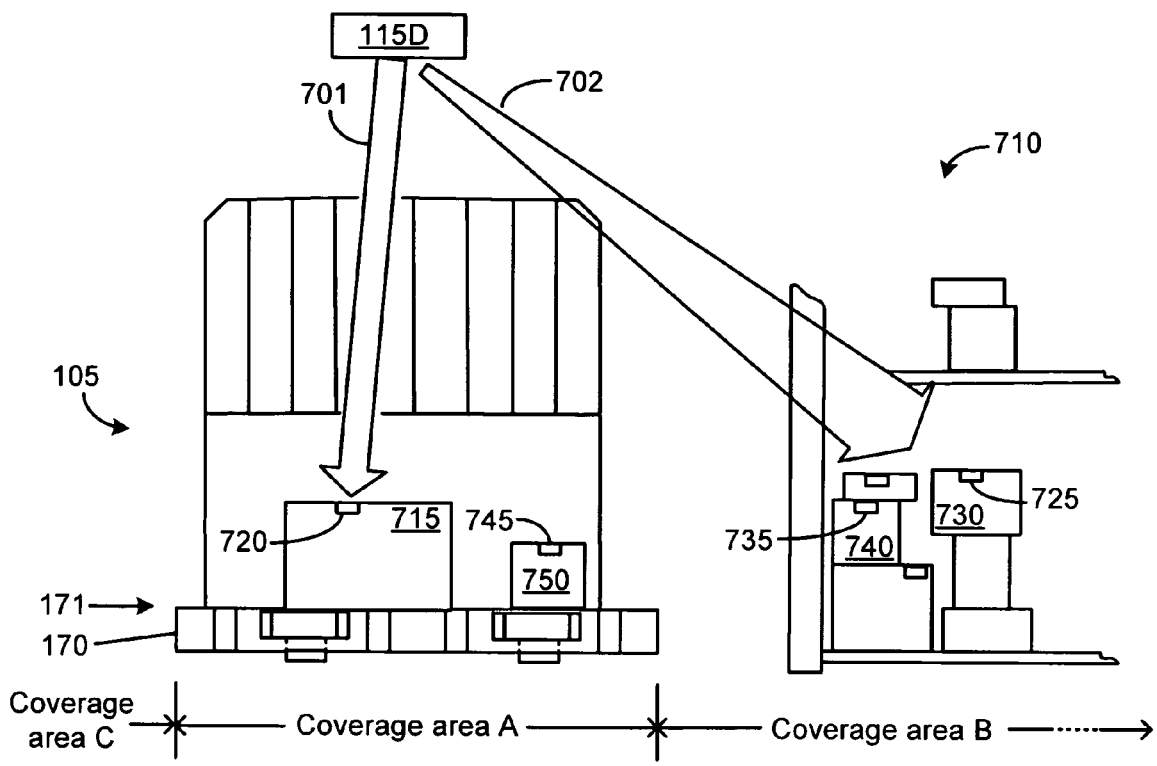
FIG. 7A shows an exemplary phased array antenna that may be used as a part of the order-picking system of FIG. 1 to provide a null at a first location with respect to the picking cart.

Attention is now drawn to FIG. 7A, which shows an RF antenna 115D that may be used as a part of the order-picking system of FIG. 1. In this exemplary embodiment, RF antenna 115D is a phased array antenna configured to provide a "null" at a selected location in coverage area "B" outside picking cart 105. A "null" may be a sharply defined region or may be defined over a broad angular region. Similar to the exemplary RF antenna 115A described using FIGS. 4A and 4B, RF antenna 115D is selected to provide significant RF coverage directed towards object-stacking surface 171 of pallet 170 while suppressing RF coverage in other directions. However, in contrast to RF antenna 115A, RF antenna 115D suppresses RF coverage to a greater degree at a specific location by generating a null. A null may be used advantageously to prevent a bidirectional RF communication link between a tag reader 110 and a RFID tag. A null mode of operation may occur within a near field region or within a far field region of RF antenna 115D. This aspect is described below in further detail.

RF antenna 115D is configurable to generate two phased array patterns. The first phased array pattern, (designated by arrow 701) contains multiple beams wherein each beam has a phase characteristic that is additive in nature to other beams in the pattern. Consequently, the first pattern produces strong RF signal strength along the direction of the pattern, with significant RF signal strength at a focal point such as one configured to coincide with RFID tag 720 attached to an object 715 located in picking cart 105. The directional nature of the first pattern allows the RFID tag reader to read RFID tag 720 while eliminating a read of another tag, such as RFID tag 735 located outside picking cart 105. RF antenna 115D can also be configured so that a strong RF signal is directed at RFID tag 745 attached to object 750 in picking cart 105.

The second phased array pattern, (designated by arrow 702) contains multiple beams wherein each beam has a phase characteristic that interferes with, and generally cancels, the RF signal present in each of the other beams in the pattern. Consequently, the second pattern strongly suppresses RF signal strength along the direction of the pattern, with significant suppression strength at a focal point referred to as the null. The coverage area provided by the null may be varied by varying the beam width of the second phased array pattern. Thereby, the null may be used to simultaneously eliminate reading RFID tags attached to multiple objects or may be used to eliminate reading of a single RFID tag attached to a single object.

The null may be suitably positioned to prevent area RFID interrogation signals from reaching RFID tags such as RFID tag 725 attached to object 730 and RFID tag 735 attached to object 740. Because a bidirectional communication link with RFID tag reader 110 is not achieved, the RFID tag reader (not shown) coupled to RF antenna 115D accurately reads RFID tags attached to objects placed on picking cart 105, while eliminating undesirable RFID responses from RFID tags located outside picking cart 105, thereby providing accurate order-picking.

Figure 7B:
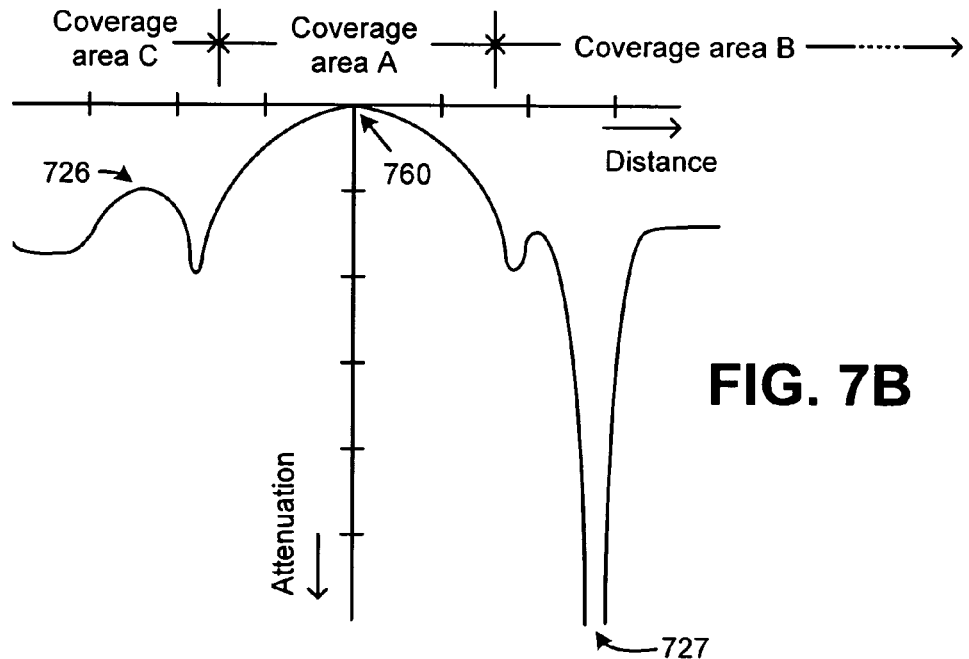
FIG. 7B shows a plot of attenuation versus distance of the antenna of FIG. 7A.

FIG. 7B shows a plot of attenuation versus distance of the antenna 115D of FIG. 7A. Null 727 provides a much greater RF attenuation in coverage area "B" than attenuation 726 in coverage area "C." Attenuation 726 is associated with a side lobe (not shown) of RF antenna 1115D. The portion of the plot designated by reference numeral 760 corresponds to maximum RF signal strength (vis-à-vis minimum attenuation) that is a result of the first phased array pattern 701.

Figure 8A:
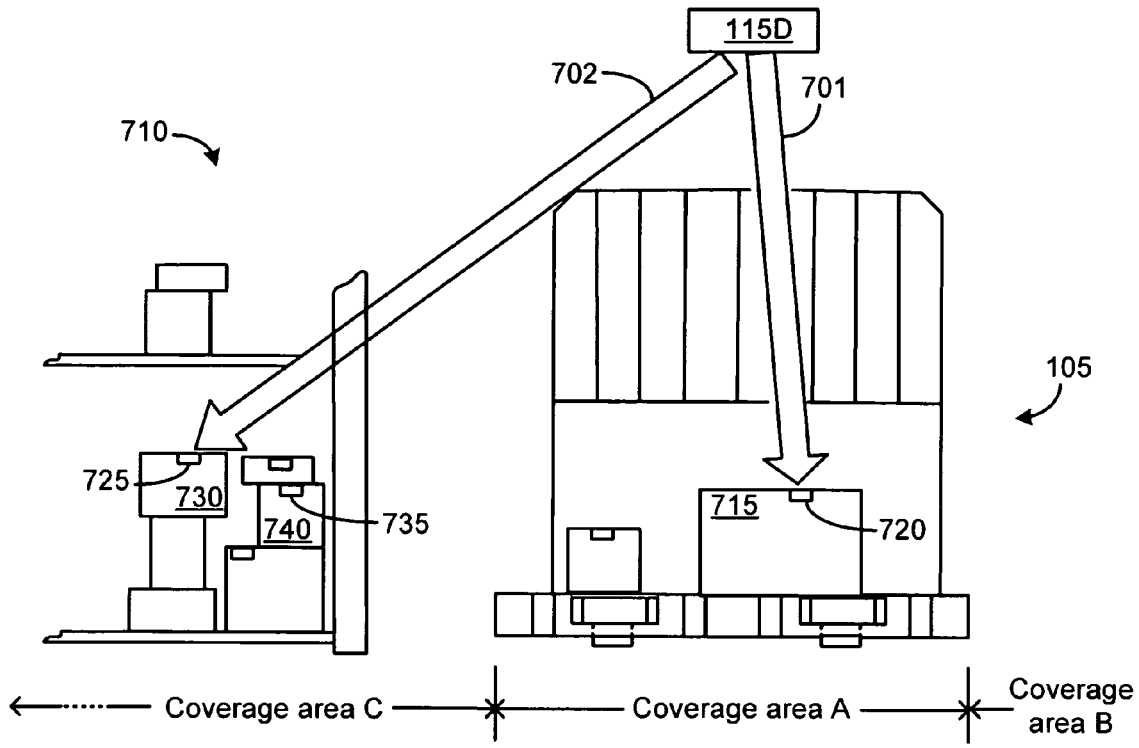
FIG. 8A shows the exemplary phased array antenna of FIG. 7A re-configured to provide null RF radiation coverage at a second location with respect to the picking cart.

FIG. 8A shows RF antenna 115D configured to direct the null radiation towards a selected location in coverage area "C" outside picking cart 105, in contrast to RF antenna 115D of FIG. 7A, which is configured to direct the null towards coverage area "B". Transferring the null from one location to another may be carried out by an operator who provides a suitable input, such as through a keyboard, into the RFID tag reader (not shown) that is coupled to RF antenna 115D. Typically, it is expected that the operator will do this based on the location of shelf 710 with reference to fork lift 105.

However, in a preferred embodiment, the RFID tag reader automatically transfers the null from one location to another without any manual input from the operator. This preferred embodiment may be implemented by coupling an object sensor (not shown) to the RFID tag reader. The object sensor, which is an opto-electronic detector for example, detects the presence of one or more objects outside picking cart 105 and provides location information of these objects to the RFID tag reader. The RFID tag reader uses this location information to steer the null and position the null upon the object so as to prevent reading of an RFID tag that may be present on the object. It will be understood that the object may be located at various places outside picking cart 105, including in front of and/or behind picking cart 105.

Figure 8B:
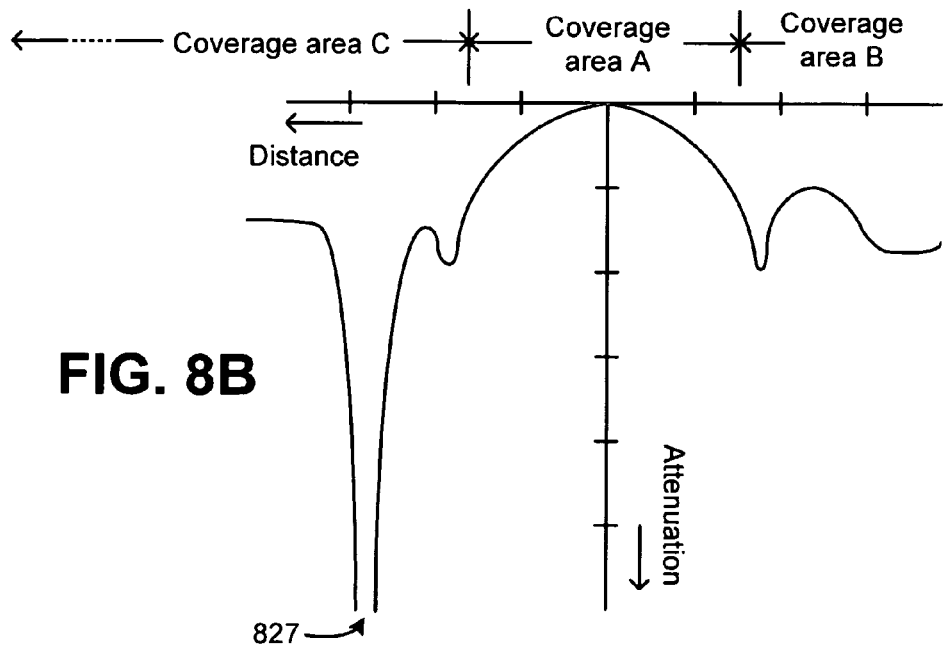
FIG. 8B shows a plot of attenuation versus distance of the antenna of FIG. 8A.

FIG. 8B shows a plot of attenuation versus distance of the antenna 115D when configured as shown in FIG. 8A. Null 727 provides significant RF attenuation at location 827 in coverage area "C".

Figure 9A:
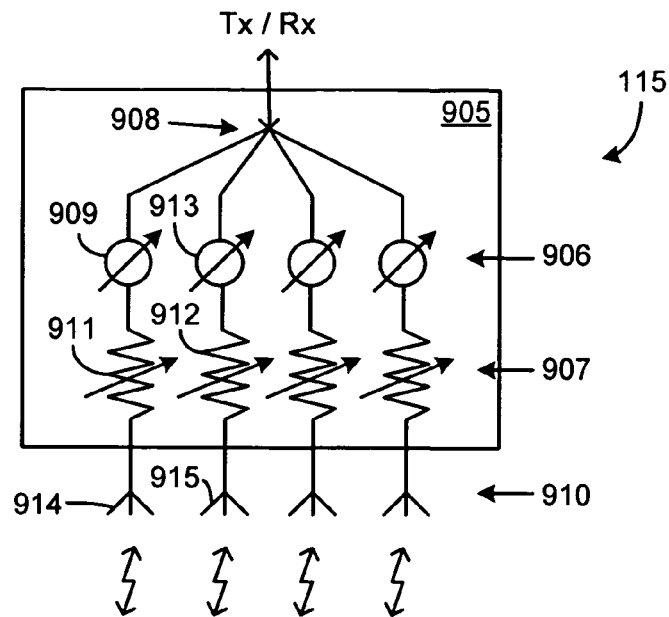
FIGS. 9A, 9B, and 9C show some alternative exemplary embodiments of a transceiver that is a part of the phased array antenna of FIG. 7A.

FIG. 9A shows a first exemplary embodiment of a transceiver that is a part of RF antenna 115. In this first exemplary embodiment, RF antenna 115 is a phased array antenna configured for RFID transmission and is composed of a transceiver 905 and an array 910 of radiating elements. Transceiver 905 contains an array 906 of phase control elements and an array 907 of bi-directional amplitude control elements. The array 907 of bi-directional amplitude control elements is coupled to the array 910 of radiating elements. Although four elements are shown in this embodiment, in other embodiments a different number of elements may be used.

Operation of the phased array antenna will be first described in a transmit direction. A transmit signal, generated by circuitry not shown in FIG. 9A, is distributively coupled into array 906 of phase control elements via a common distribution node or network 908 where suitable hardware such as a power splitter is incorporated. The hardware of node 908 is omitted from FIG. 9A because such hardware is known in the art. Each of the phase control elements of the array 906 of phase control elements is adjustable to provide a desired phase delay to the transmit signal that is being propagated through the phase control element. For example, phase control element 909 may be adjusted to provide −90° phase delay to the transmit signal propagating through phase element 909, while phase control element 913 may be adjusted to provide −15° phase delay to the transmit signal propagating through phase control element 913. The phase adjustments can be varied over time depending on the nature of the desired transmit signal for emission from RF antenna 115. In other words, the control may be dynamically varied according to the method or algorithm used in the order picking system.

Each of the array 907 of bi-directional amplitude control elements is adjustable to provide a desired amplitude to the transmit signal propagated through the individual bi-directional amplitude control element. For example, bi-directional amplitude control 911 can be adjusted to provide a −10 dB attenuation upon the transmit signal propagated through bi-directional amplitude control 911, while bi-directional amplitude control 912 can be adjusted to provide −40 dB attenuation upon the transmit signal propagated through bi-directional amplitude control 912.

Each of the radiating elements in array 910 of radiating elements radiates an individual transmit component of the transmit signal where each individual transmit component has an individual phase and an individual amplitude characteristic determined by the respective phase control element and amplitude control element. Control of phase and amplitude permits RF antenna 115 to transmit a controllable, phased array transmit RF signal. Consequently, RF antenna 115 is configurable to provide various operating modes such as RF beam steering, RF beam focus, and RF beam directivity for example.

Complementary to the transmit RF signal, an RF receive signal received by the phased array antenna of FIG. 9A is received by the individual radiating elements of array 910 of radiating elements. These individually-received signals propagate through array 907 of bi-directional amplitude control elements and array 906 of phase control elements and are combined at node 908, which operates as a combiner junction. Again, the functionality and hardware of node 908 in the combiner mode of operation is known in the art. For example, the power splitter operates as a power combiner when a signal propagates through it in the opposite direction.

Figure 9B:
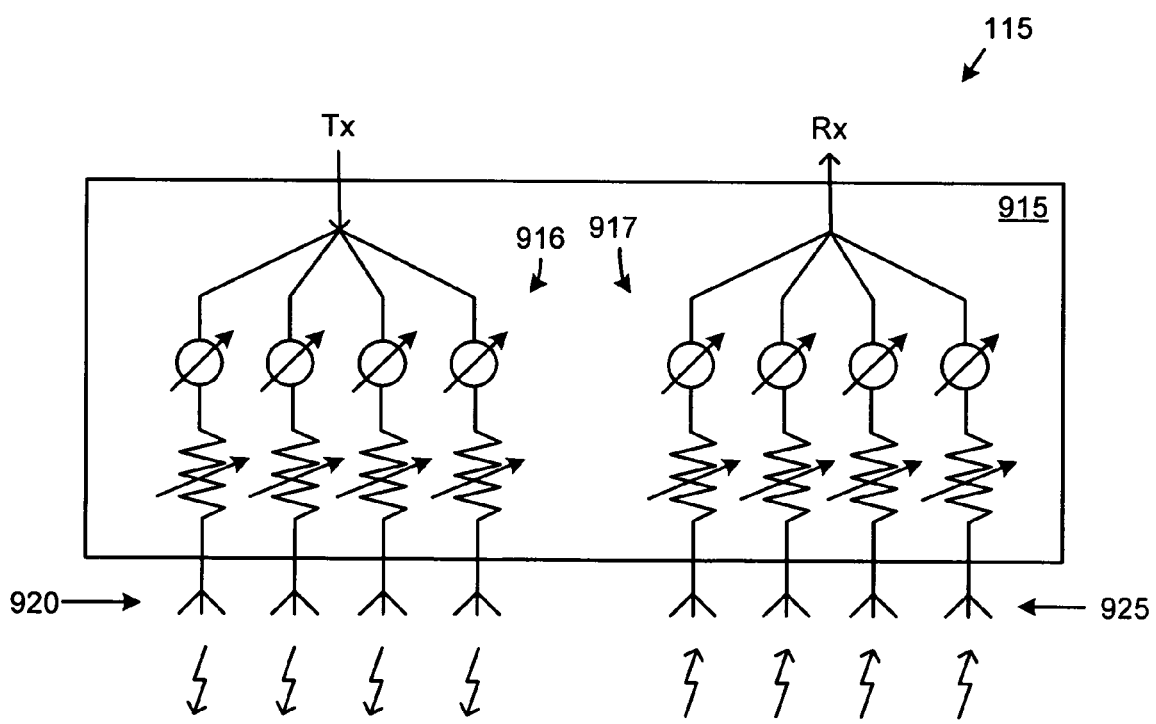

FIG. 9B shows a second exemplary embodiment of a transceiver that is a part of RF antenna 115. In this second exemplary embodiment, RF antenna 115 is a phased array antenna configured for RFID transmission and is composed of two individual sections. Section 916 provides transmit signal functionality through a first array 920 of radiating elements, while section 917 provides receive signal functionality through a second array 925 of radiating elements. Sections 916 and 917 are operable independent of one another. Consequently, the phase and amplitude of the phased array transmit signal can be set independent of the phase and amplitude of the phased array receive signal. Sections 916 and 917 contain elements similar to the elements described with reference to FIG. 9A and the operation of these elements can be deduced from the description provided above for FIG. 9A.

Figure 9C:
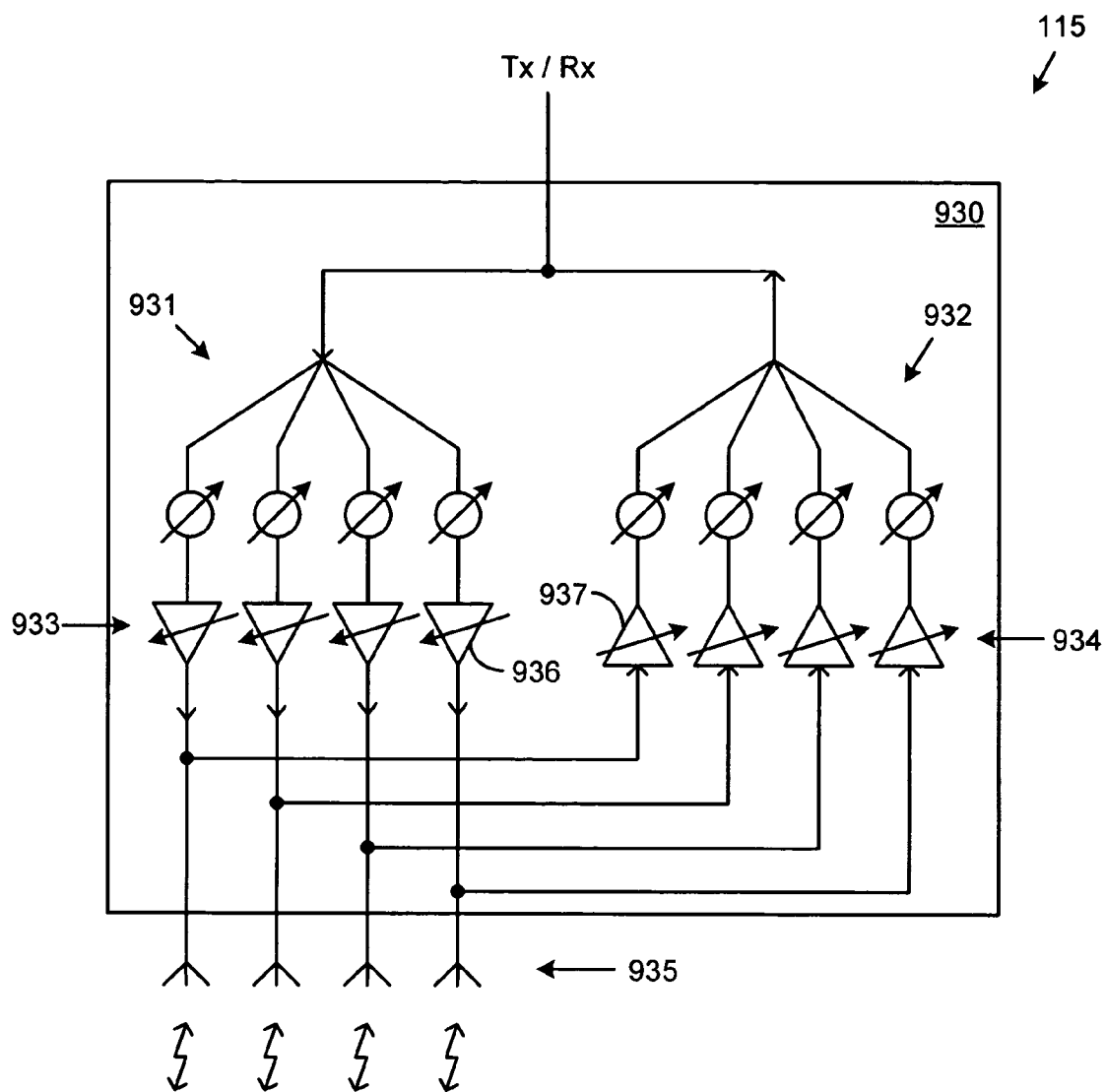

FIG. 9C shows a third exemplary embodiment of a transceiver that is a part of RF antenna 115. In this third exemplary embodiment, RF antenna 115 is a phased array antenna containing two independent sections 931 and 932 for the transmit and the receive direction of operation respectively. However, both sections are coupled to a common array 935 of radiating elements that operates to radiate as well as receive RF signals. Furthermore, section 931 includes an array 933 of gain control elements that is adjustable to provide signal gain in the transmit direction. Section 932 includes an array 934 of gain control elements that is adjustable to provide signal gain in the receive direction. For example, gain control element 936 in array 933 may be adjusted to provide +10 dB of gain to a transmit signal propagating through gain control element 936 in the transmit direction, while gain control element 937 in array 934 may be adjusted to provide +40 dB of gain to a receive signal propagating through gain control element 937 in the receive direction. Individual gain control elements of array 933 and 934 may be further adjustable, in some embodiments, to provide signal attenuation rather than signal gain.

The RF antenna 115 embodiments described with reference to FIGS. 9A, 9B and 9C may be used individually, or in various combinations of individual features, to provide antenna functionality in the exemplary order-picking systems described using FIGS. 5, 6, 7A, 7B, 8A and 8B.

Figure 10:
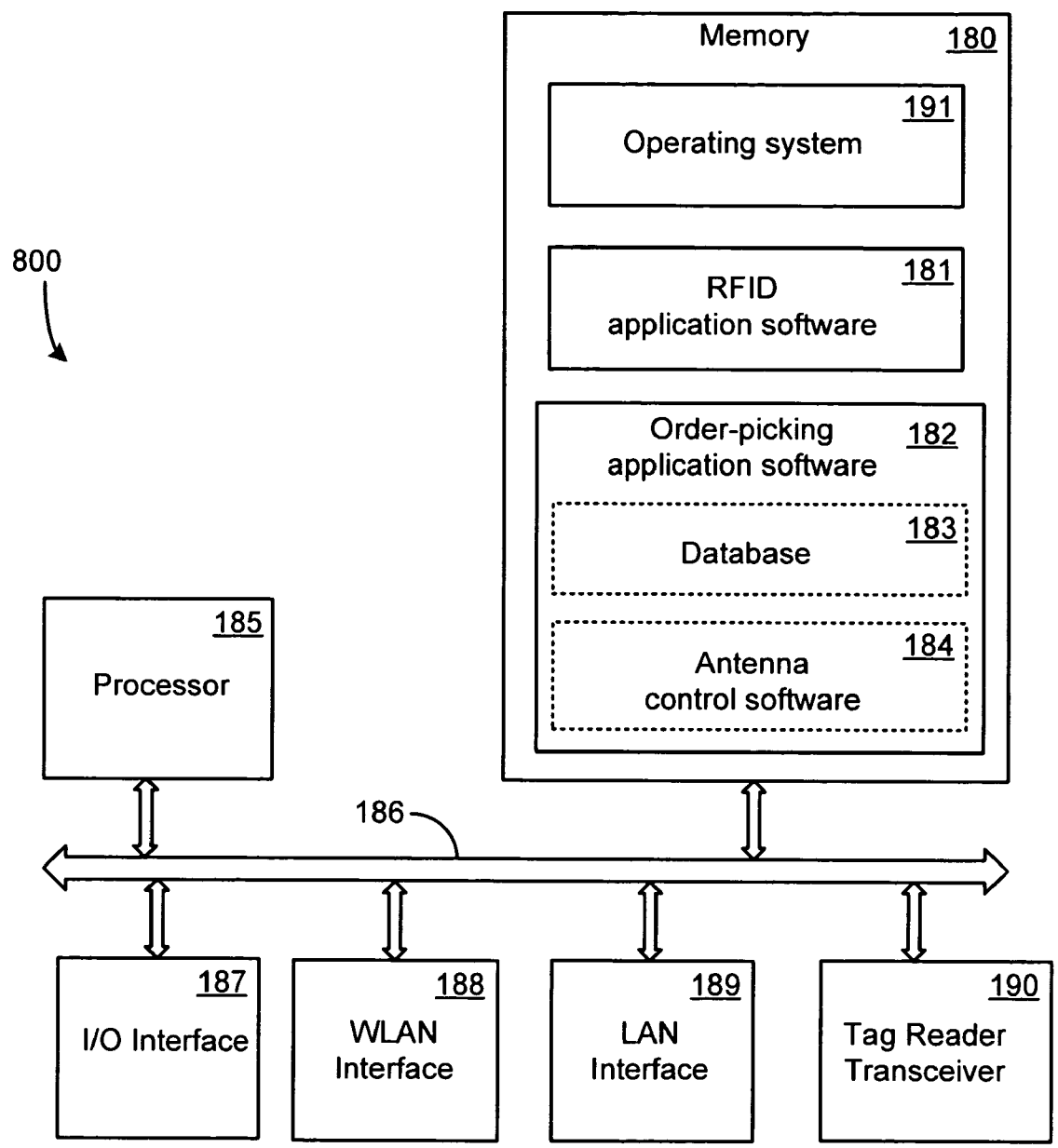
FIG. 10 shows a block diagram of an exemplary embodiment of an RFID tag reader that may be used as a part of the order-picking system of FIG. 1.

Attention is now drawn to FIG. 10, which shows a block diagram of an exemplary embodiment of an RFID tag reader 800 incorporating the order-picking system illustrated in FIG. 1. The order-picking system in accordance with the invention can be implemented in software (e.g., firmware), hardware, or a combination thereof. In this exemplary embodiment, the order-picking system is implemented in software as an executable program executed by RFID tag reader 800, which is in this instance, a special or a general purpose computer.

Generally, in terms of hardware architecture as shown in FIG. 10, RFID tag reader 800 includes a processor 185, memory 180, and one or more input and/or output (I/O) devices (or peripherals) that are communicatively coupled via a local interface 186. The local interface 186 can be, for example but not limited to, one or more buses or other wired or wireless connections, as is known in the art.

The local interface 186 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 185 is a hardware device for executing software, particularly that stored in memory 180. The processor 185 can be any custom made or commercially available processor, a central processing unit (CPU), an auxiliary processor among several processors associated with a computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 180 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 180 may incorporate electronic, magnetic, optical, and/or other types of storage media. Note that the memory 180 can have a distributed architecture, where various components are situated remote from one another, but can be accessed by the processor 185.

The software in memory 180 may include one or more separate programs, each of which comprises an ordered listing of executable instructions for implementing logical functions. In the example of FIG. 10, the software in the memory 180 includes RFID application software 181 and order-picking application software 182, which may optionally include database 183 and antenna control software 184, and a suitable operating system (O/S) 191. The operating system 191 essentially controls the execution of other computer programs, such as the RFID application software 181 and order-picking software 182, and provides scheduling, input-output control, file and data management, memory management, and communication control and related services.

The order-picking application software 182 may be written as a source program, executable program (object code), script, or any other entity comprising a set of instructions to be performed. When a source program, then the program needs to be translated via a compiler, assembler, interpreter, or the like, which may or may not be included within the memory 180, so as to operate properly in connection with the O/S 191. Furthermore, the order-picking application software 182 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O interface 187 may include input devices, for example but not limited to, a keyboard, mouse, scanner, microphone, etc. Furthermore, I/O interface 187 may also include output devices, for example but not limited to, a printer, display, etc.

Wireless local area network (WLAN) interface 188 is operable to provide wireless network connectivity between RFID tag reader 800 and a controller (not shown) located remote to RFID tag reader 800. Local area network (LAN) interface 189 provides network connectivity between RFID tag reader 800 and other devices that may be mounted on the picking cart. Tag reader transceiver 190 is operable to transmit one or more RFID interrogation signals from RFID tag reader 800. Tag reader transceiver 190 is further operable to receive one or more RFID signals from one or more RFID tags attached to tagged objects located external to RFID tag reader 800.

Memory 180 may further include a basic input output system (BIOS) (omitted for simplicity). The BIOS is a set of essential software routines that initialize and test hardware at startup, start the O/S 191, and support the transfer of data among the hardware devices. The BIOS is stored in ROM so that the BIOS can be executed when the computer is activated.

When RFID tag reader 800 is in operation, the processor 185 is configured to execute software stored within the memory 180, to communicate data to and from the memory 180, and to generally control operations of RFID tag reader 800 pursuant to the software. The order-picking application software 182 and the O/S 191, in whole or in part, but typically the latter, are read by the processor 185, perhaps buffered within the processor 185, and then executed. Order-picking application software 182 optionally includes database 183, which may be used to store RFID codes retrieved from one or more RFID tags attached to tagged objects located external to RFID tag reader 800. Order-picking application software 182 may further optionally include antenna control software 184 that may be used to configure an RFID antenna such as a phased array antenna.

When the order-picking system is implemented in software, as is shown in FIG. 10, it should be noted that order-picking application software 182 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The order-picking application software 182 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CD ROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the order-picking system is implemented in hardware, the order-picking system can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 11:
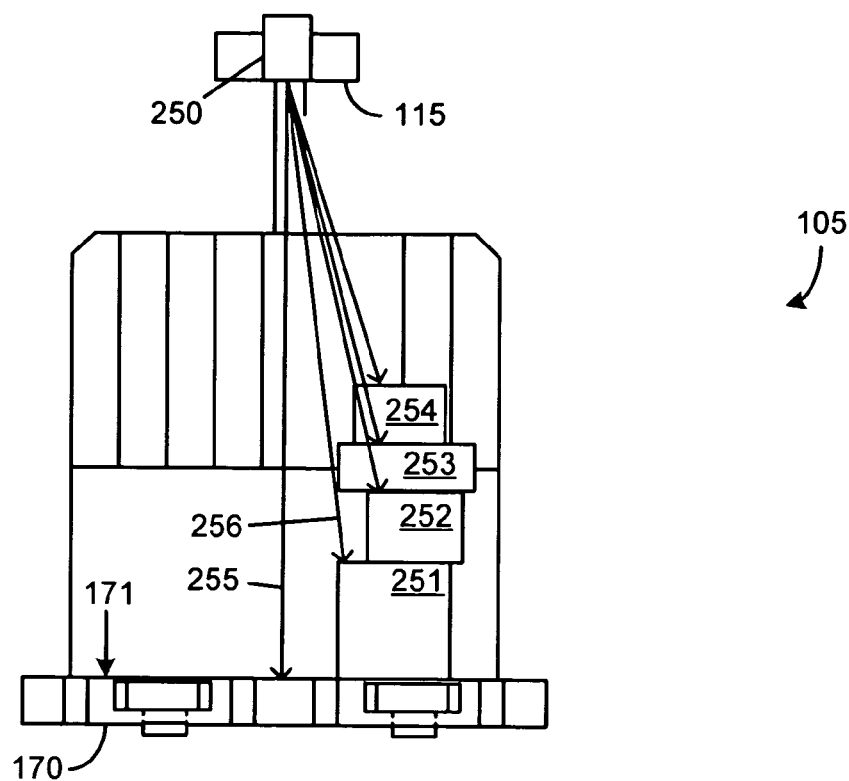
FIG. 11 shows an exemplary embodiment of a range finder that may be used as a part of the order-picking system of FIG. 1.

FIG. 11 shows an exemplary embodiment of a range finder 250, which may be used as a part of an order-picking system mounted on a picking cart, such as forklift 105. Range finder 250 is coupled to an RFID tag reader (not shown) in accordance with the invention. In one exemplary embodiment, range finder 250 is attached to RF antenna 115 such that an operating surface of range finder 250 is located flush with an RF radiating surface of RF antenna 115. In other embodiments, range finder 250 may be installed on alternative locations on forklift 105. Range finder 250 can be implemented in several alternative ways. Some examples of range finder 250 include a laser range finder, an ultrasonic range finder, and a radio frequency (e.g. microwave) range finder.

In operation, range finder 250 transmits a ranging signal 255 (light, sound, microwave etc.) downwards in a direction towards object-stacking surface 171 of pallet 170. The ranging signal strikes object-stacking surface 171 and is reflected back towards range finder 250. Range finder 250 utilizes the time delay between transmission of ranging signal 255 and receiving of the corresponding reflected signal to determine range information between range finder 250 and object-stacking surface 171. Because range finder 250 is co-located with RF antenna 115, the range information obtained by range finder 250 provides range information between RF antenna 115 and object-stacking surface 171. This range information is transferred to the RFID tag reader that is coupled to range finder 250. RFID tag reader uses this range information as a reference range.

Range finder 250 then transmits a second ranging signal, for example, ranging signal 256 in a different direction towards object-stacking surface 171. The second ranging signal strikes an external surface of an object 251 located on object-stacking surface 171 and is reflected back towards range finder 250. Range finder 250 utilizes the time delay between transmission of ranging signal 256 and receiving of the corresponding reflected signal to determine a second range information between range finder 250 and the external surface of object 251. This second range information is transferred to the RFID tag reader which then uses the second range information together with the reference range information (by subtraction, for example) to determine that object 251 has been placed on object-stacking surface 171.

Range finder 250 can be similarly used to determine placement of other objects such as objects 252, 253, and 254 that are stacked on top of object 251. Therefore, range finder 250 can be operated on a regular or an irregular basis to determine if one or more objects have been placed on the picking cart inside the perimeter of object-stacking surface 171, whether such objects are placed directly on top of object-stacking surface 171 or are stacked one on top of another on the object-stacking surface 171. The ranging information captured in this series of operations may be stored in a database, such as database 183 of FIG. 10, and used to verify that an object has been newly placed in the picking cart, and also to determine if an object has been removed from the picking cart.

In addition to assisting the RFID tag reader in detecting placement of objects upon picking cart 105, range finder 250 may be further used to assist the RFID tag reader in configuring RF antenna 115. For example, in one case, the ranging information is used to set a near-field focus of RF antenna 115 upon an object placed in picking cart 105 thereby eliminating undesirable reads of RFID tags located outside picking cart 105. The ranging information may be further used to control other antenna parameters, such as radiated RF signal strength. An attenuated RF signal may be used to provide selective RF coverage upon objects in picking cart 105 while suppressing RF coverage on areas outside picking cart 105.

When range finder 250 is used, RF antenna 115 is a patch antenna in a first exemplary embodiment and a phased array antenna in another exemplary embodiment.

Figure 12:
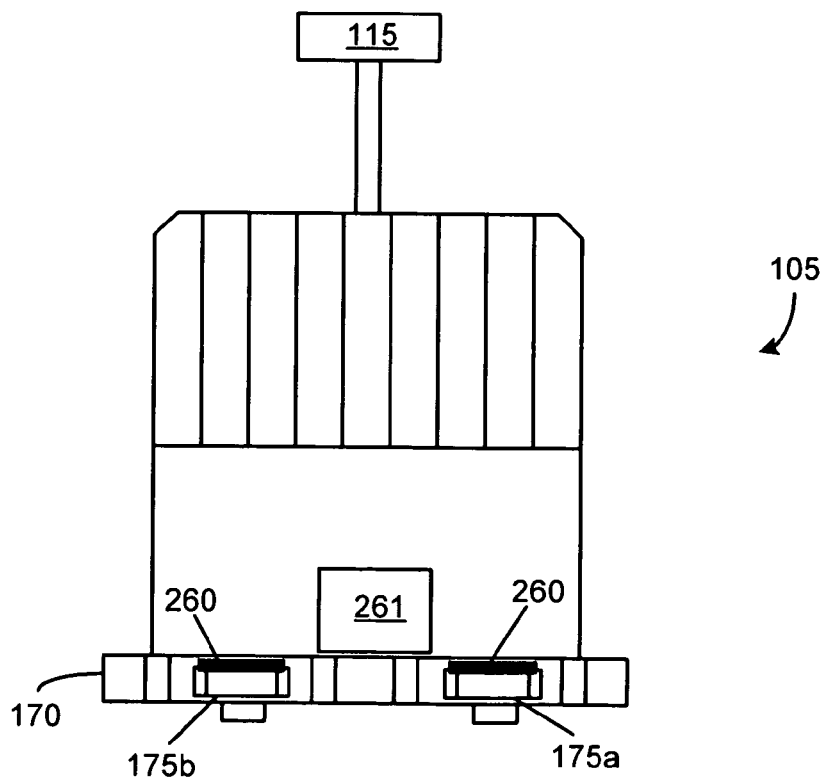
FIG. 12 shows an exemplary embodiment of a weighing system that may be used as a part of the order-picking system of FIG. 1.

FIG. 12 shows an exemplary embodiment of a weighing system 260, which may be used as a part of an order-picking system mounted on a picking cart, such as forklift 105. Weighing system 260 is coupled to an RFID tag reader (not shown) in accordance with the invention. In one exemplary embodiment, weighing system 260 is a two-component system mounted on the top surfaces of forks 175a and 175b of forklift 105. Pallet 170 rests on weighing system 260 when pallet 170 is carried by forklift 105. As a result, weighing system is operable to sense any change in weight imposed on pallet 170 when for example, an object is placed on pallet 170.

In operation, an initial weight imposed on weighing system 260 as a result of an empty pallet 170 is measured by weighing system 260 and the RFID tag reader is provided with this initial weight. Subsequently, when an object such as object 261 is placed on pallet 170, weighing system 260 is used to measure a second weight and RFID tag reader is provided this second weight. The RFID tag reader uses the second weight together with the initial weight to determine the weight of object 261 and also to sense placement of object 261 on pallet 170.

In one exemplary mode of operation, weighing system 260 is merely used to sense a change of weight imposed on weighing system 260 and the actual weight is not measured. When RFID tag reader reads an RFID tag at any instant, a change-in-weight signal provided by weighing system 260 is used to validate placement of an object on pallet 170. Consequently, false tag reads by the RFID tag reader can be discarded if weighing system 260 does not provide a valid change-in-weight signal. Elimination of such false reads improves the accuracy of operation of the object picking system in accordance with the invention.

It will be understood that ranging system 250 of FIG. 11 and weighing system 260 of FIG. 12 can be used independently; in combination with one another; and in combination with other embodiments (phased array antenna, for example). All these variants are encompassed within the scope of this disclosure.

Figure 13:
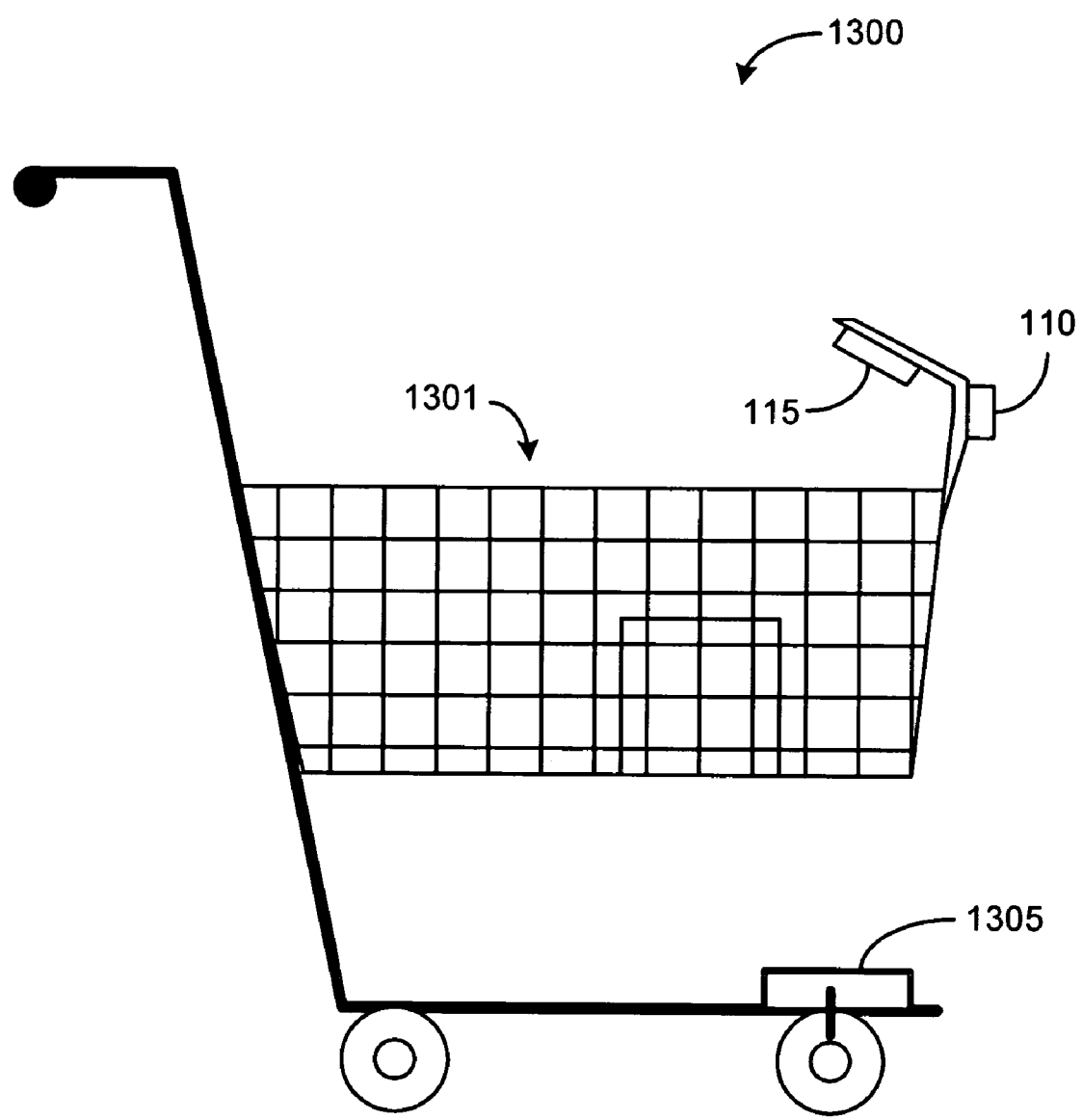
FIG. 13 shows an alternative embodiment of a picking cart on which are mounted some components of an exemplary order-picking system in accordance with the invention.

FIG. 13 shows an alternative embodiment of a picking cart on which is mounted some components of an order-picking system in accordance with the invention. In this alternative embodiment, the picking cart is a shopping cart 1300 on which is mounted RF antenna 115 and RFID tag reader 110. RF antenna 115 is directed towards an object-stacking area 1301 to read RFID tags of tagged objects that have been picked by a cart user (not shown) and placed in shopping cart 1300.

Also shown, is a motion detector 1305 that is operative to detect motion of shopping cart 1300. Motion detector 1305 is coupled to RFID tag reader 110 to provide motion information. The motion information may be used as a part of an algorithm, for example, used to detect placement of objects in shopping cart 1300 while eliminating tag reads from external objects such as those located on store shelves nearby.

In one exemplary algorithm, an RFID tag attached to an object placed in the shopping cart is read when shopping cart 1300 is stationary. This first read may pick up undesirable RFID reads from objects nearby that are located outside shopping cart 1300. The first RFID read is followed by a second RFID read when shopping cart 1300 is in motion. This second RFID read eliminates the undesirable RFID reads by detecting that the previous RFID reads are no longer present because the objects located outside shopping cart 1300 are no longer in range of the RF antenna 115.

Additional hardware elements, such as RF shielding on the sides of shopping cart 1300, may be optionally added to provide better detection of tagged objects placed inside shopping cart 1300 and eliminate false reads from RFID tags attached to objects external to shopping cart 1300. It will be understood that in alternative embodiments, motion detector 1305 incorporates various sensing technologies. Motion detector 1305 is installed at suitable locations on various types of picking carts.

Figure 14:
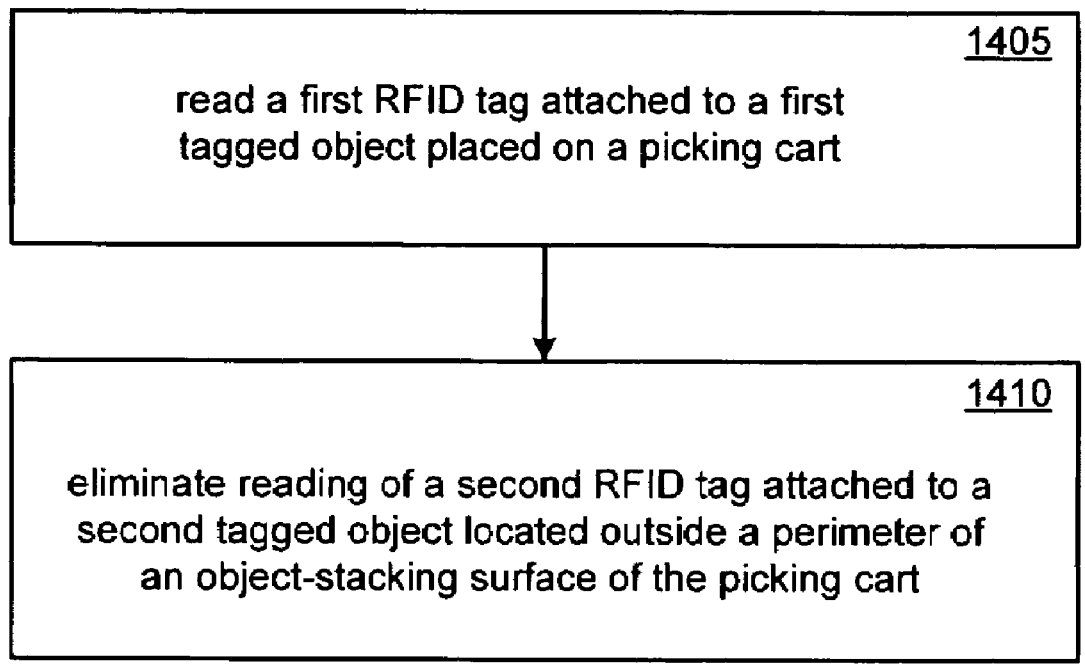
FIG. 14 shows a flowchart of a first exemplary method for order-picking.

FIG. 14 shows a flowchart of a first exemplary method for order-picking in accordance with the invention. In this flowchart and other flowcharts described below, it will be understood that the method steps identified in the individual blocks may be implemented in a different order. For example, two or more blocks may be implemented in reverse order or implemented simultaneously. Consequently, in certain embodiments, blocks 1405 and 1410 may be implemented simultaneously.

Block 1405 includes the step of reading of a first RFID tag attached to an object placed on a picking cart. In block 1410 reading of a second RFID tag attached to a different object located outside a perimeter of the object-stacking surface of the picking cart is eliminated.

The steps shown in blocks 1405 and 1410 can be implemented in a variety of ways. For example, reading of the first RFID tag (block 1405) may be carried out by using an RFID tag reader mounted on the picking cart, where the tag reader is coupled to a suitable antenna. Such an antenna may be a simple RF antenna having a fixed beam characteristic, for example a narrow beam directed towards the object-stacking surface of the picking cart. Alternatively, the RF antenna may be a phased array antenna controllable by the RFID tag reader to provide certain desired beam characteristics, for example beam steering, nulling, and variable focus.

The step shown in block 1405 may also be implemented by selecting a suitable RF antenna. In one example, the RF antenna has a beam characteristic that provides suppression of RF coverage in areas outside the perimeter of the object-stacking surface of the picking cart. In another example, a phased array antenna is used to provide an RF null, which may further be a steerable null in a near-field or far-field region of an antenna 115. The RF null is typically positioned at an area outside the perimeter of the object-stacking surface to eliminate reading of RFID tags attached to objects located outside the picking cart, on a warehouse shelf or floor for example. In some embodiments, the RF null may be positioned inside the perimeter of the object-stacking surface.

The step shown in block 1405 may be further implemented by providing an algorithm in the RFID tag reader. The algorithm is used to determine placement of the object on the picking cart while eliminating undesirable reads, such as those from an RFID tag located outside the picking cart and from an RFID tag attached to an object that had been placed earlier on the picking cart. The algorithm may optionally incorporate ranging, motion, and weight information using one or more of the exemplary ranging, motion-detecting, and weighing systems described above.

Figure 15:
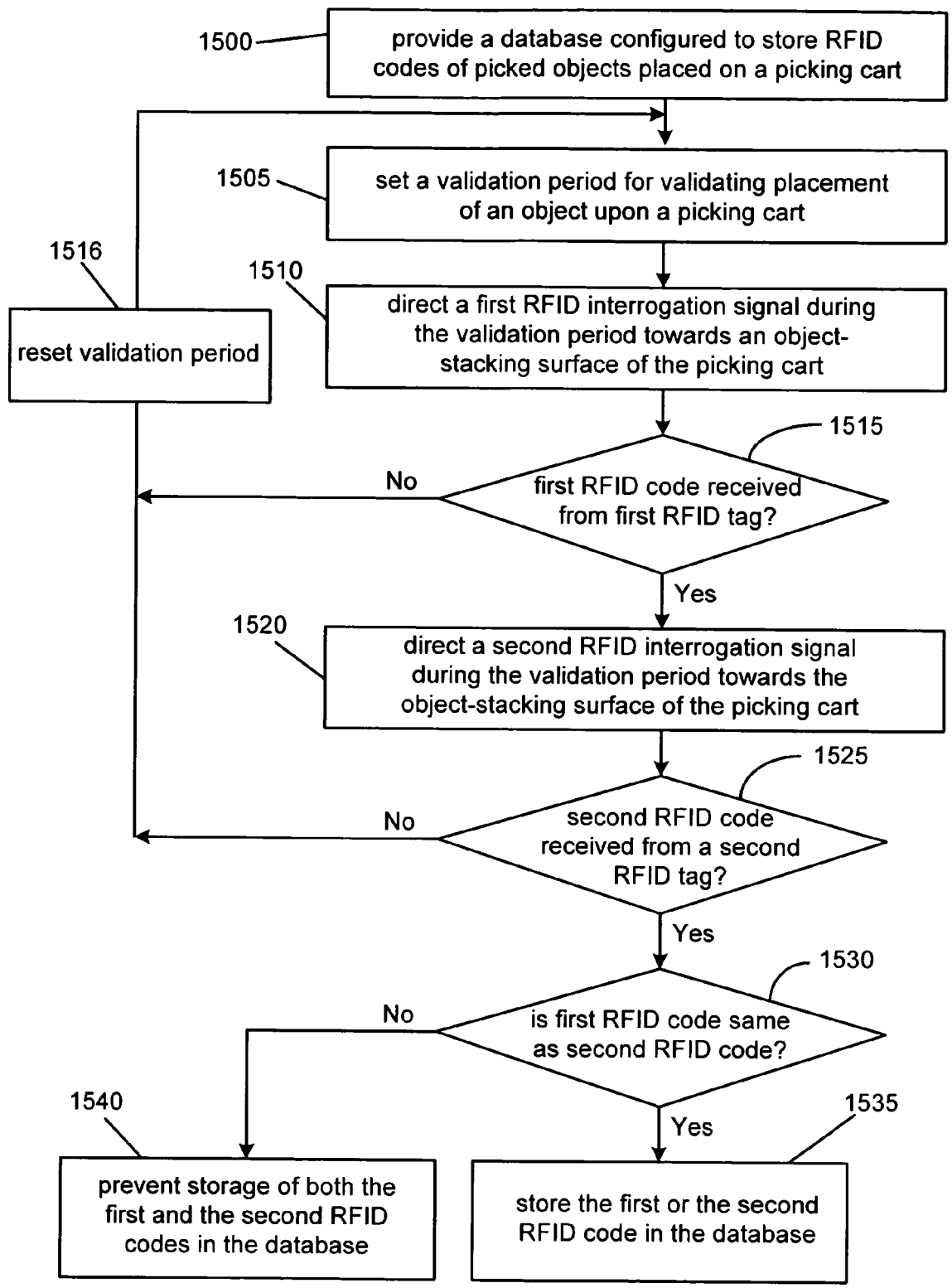
FIG. 15 shows a flowchart of a second exemplary method for order-picking.

FIG. 15 shows a flowchart of a second exemplary method for order-picking in accordance with the invention. The primary objective of this exemplary method for order-picking is to identify objects placed in a picking cart and exclude objects that are located outside the picking cart.

In block 1500, a database is provided. The database is configured to store RFID codes of objects that have been picked from an object storage area, such as a shelf for example, and placed in a picking cart.

In block 1505, a validation period is set. The validation period is a time slot that is used repetitively, regularly or irregularly, to carry out RFID interrogations and validate placement of one or more objects upon a picking cart. For example, a first validation period may be used to validate placement of a first object upon the picking cart by carrying out RFID interrogations and detecting responses from RFID tags during this first validation period. A subsequent validation period, which may or not be equal to the first validation period, may then be used along with further RFID interrogations to validate placement of a second object upon the picking cart at a later instant.

The validation period is generally selected based on the nature of the order-picking system. For example, if the application is a warehouse application, the validation period may be selected to correspond to an average time that a picking cart operator would take to pick up an object from a warehouse shelf and place it on the picking cart.

As a further example, the validation period may be based on motion detection. In this case, the validation period may be set to correspond to an average time that the picking cart is expected to remain stationary.

In block 1510, a first RFID interrogation signal is directed towards the object-stacking surface of the picking cart. The interrogation signal is transmitted during the validation period. In one example, the first RFID interrogation signal is transmitted at the start of the validation period.

In block 1515, an RFID tag attached to an object responds to the first interrogation signal by transmitting its RFID code. If no RFID code response is obtained, the validation period is re-set as shown in block 1516. In one embodiment, resetting the validation period is carried out immediately after waiting for a reasonable period for the RFID system to operate for receiving an RFID code response. This waiting period is typically significantly less than the validation period and is generally equal to RF signal transmit propagation time plus RF receive signal propagation time plus signal processing delay. In another embodiment resetting of the validation period is carried by providing a delay until the start of the following validation period.

After resetting of the validation period in block 1516, the first interrogation signal is re-transmitted as shown in block 1510.

In block 1520, upon receiving the RFID code from the RFID tag, a second RFID interrogation signal is directed towards the object-stacking surface of the picking cart. The second RFID interrogation signal is also transmitted during the validation period any time after the first RFID interrogation signal has been transmitted. In one example, the second RFID interrogation signal is transmitted at the end of the validation period.

In block 1525, an RFID tag, which may or may not be the same as the first RFID tag, responds to the second interrogation signal by transmitting its RFID code. If no response is obtained to the second interrogation signal, the validation period is reset as shown in block 1516, and the first interrogation signal is re-transmitted as shown in block 1510.

In block 1530, the first RFID code is compared to the second RFID code. If the two RFID codes are identical, in block 1535, either code is stored in the database. Typically, the two RFID codes are identical because the first as well as the second RFID interrogation signal was responded to by the same RFID tag attached to the object that has been placed in the picking cart.

If the two RFID codes are not identical, in block 1540, neither code is stored in the data base. Typically, the two RFID codes are not identical when the first RFID code is transmitted from an RFID tag attached to a first object and the second RFID code is transmitted from a different RFID tag attached to a different object. The different object may be located on a shelf nearby and has not been picked for placement in the picking cart.

Figure 16:
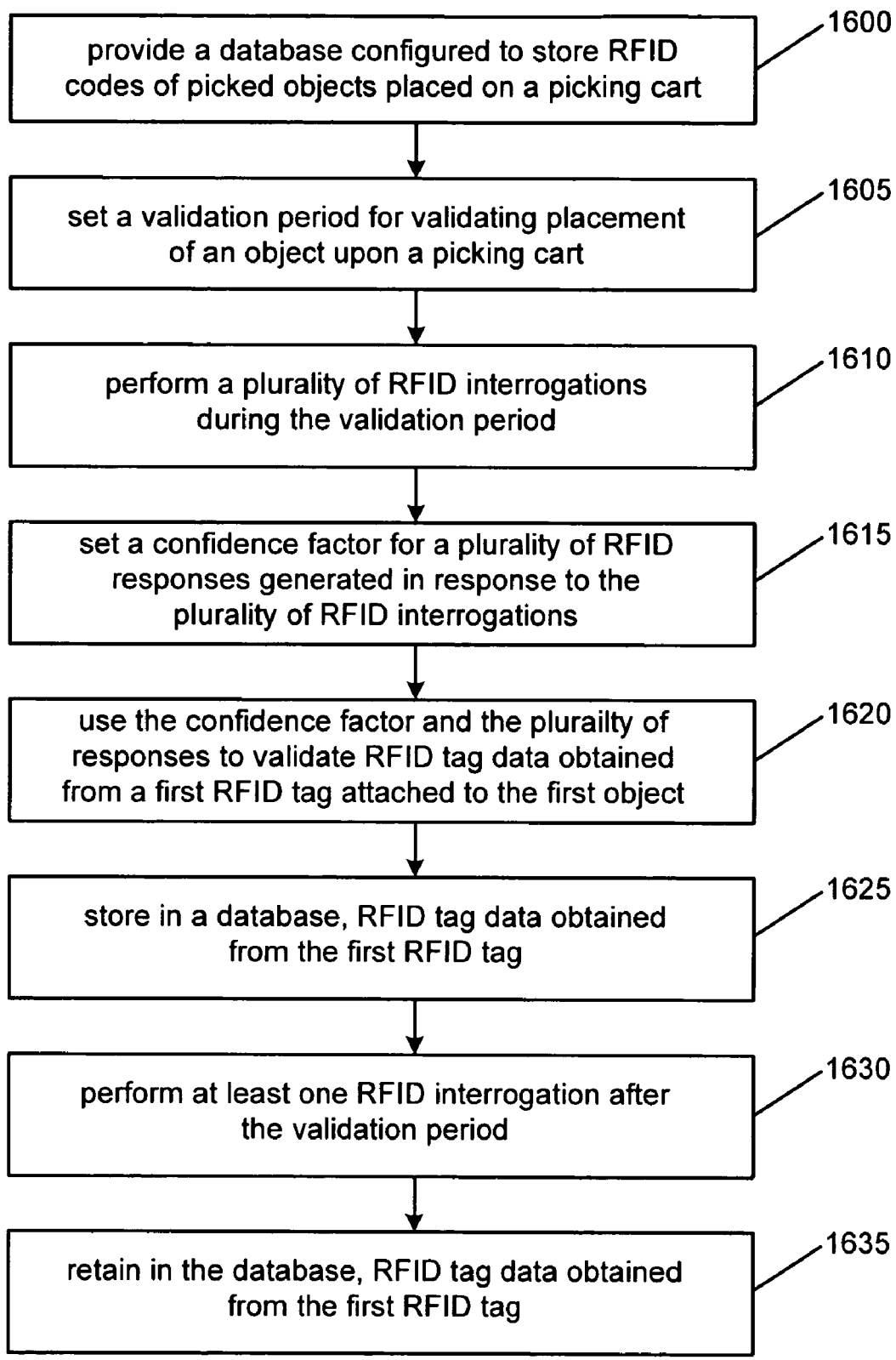
FIG. 16 shows a flowchart of a third exemplary method for order-picking.

FIG. 16 shows a flowchart of a third exemplary method for order-picking in accordance with the invention. Unlike the second exemplary embodiment described above where only two RFID interrogation signals were successively transmitted during a validation period, in this third exemplary embodiment, more than two RFID interrogation signals are used during the validation period. Again, the primary objective of this third exemplary method for order-picking is to identify objects placed in the picking cart and exclude objects located outside the picking cart.

Blocks 1600 and 1605 are similar to blocks 1500 and 1505 of FIG. 15 and consequently, will not be repeated here. In block 1610, a number of RFID interrogation signals are generated during the validation period. The RFID interrogation signals are generally directed towards the object-stacking surface of the picking cart. Each of these RFID interrogation signals typically generates one or more RFID responses from one or more RFID tags respectively if such RFID tags are located within reach of the RFID interrogation signal. Some of these RFID tags may be attached to objects placed in the picking cart while others may be attached to objects located outside the picking cart.

In block 1615, a confidence factor is set. The confidence factor is a measure of the expected quality of RFID tag information that can be reliably gleaned from the RFID responses. Several parameters may be used in setting the confidence factor. In a first exemplary embodiment, the confidence factor is set in accordance with the performance of the RFID system. For example, an RFID system may include a phased array antenna that provides focused RF coverage, beam steering, and nulling. Such an RFID system provides higher accuracy than a system incorporating an antenna with poor directivity and lacking beam control. The confidence level in the phased array antenna system may be set at 100%, while the other system may be set at 50%.

In a second exemplary embodiment, the confidence factor is set based on movement of the picking cart. In this case, a first set of RFID responses corresponds to a first position of the picking cart and a second set of RFID responses corresponds to a second position of the picking cart. The confidence factor is considered "high" if the two sets of RFID responses have high similarity.

In a third exemplary embodiment, the confidence factor is set based on a majority vote. The confidence factor may be set at 85% for example, where a 15% probability of undesirable RFID responses is expected. Consequently, if 85% of the RFID responses are identical a positive determination is made that the object is indeed located in the picking cart.

In a fourth exemplary embodiment, the confidence factor is set based on a probability of an object being erroneously placed and then removed from the picking cart. For example, in one case an experienced operator may never place an object erroneously on the picking cart. Consequently, once the object is identified as placed in the picking cart, the object picking system is highly confident that the object is still on the picking cart even if an RFID tag attached to the object does not respond to RFID interrogation signals. However, in a second case, an inexperienced operator may erroneously place and then remove one or more objects from the picking cart. Consequently, the confidence factor in this case is lower than in the previous case.

In block 1620, the confidence factor is used in conjunction with RFID responses generated in the step shown in block 1610 to validate RFID tag data obtained from the RFID tag attached to the object placed in the picking cart. Such RFID tag data includes, for example, an RFID code and certain other particulars of the object.

In block 1625, the RFID tag data is stored in the database. Once the RFID tag data has been stored in the data base, any further RFID response or lack of RFID response from that particular RFID tag is immaterial. Blocks 1630 and 1635 are shown to explain this functionality. The functionality wherein stored RFID data is not removed from the database once stored there, relates to the fact that under certain conditions this particular RFID tag may be subsequently unable to provide valid RFID responses. For example, such a situation may occur if a second object is placed on top of the first object whose RFID tag data has been stored already. The second object blocks a subsequent RFID interrogation signal from reaching the RFID tag on the object below. It is reasonable to assume that the first object has not been removed from the picking cart even if no RFID response signal is elicited from its RFID tag in response to the subsequent RFID interrogation signal. This assumption is coupled to the confidence factor as explained above.

In block 1630, at least one additional RFID interrogation is performed. In block 1635, irrespective of the response or lack thereof to the additional RFID interrogation, the RFID tag data is retained in the database due to the reasons explained above.

Figure 17:
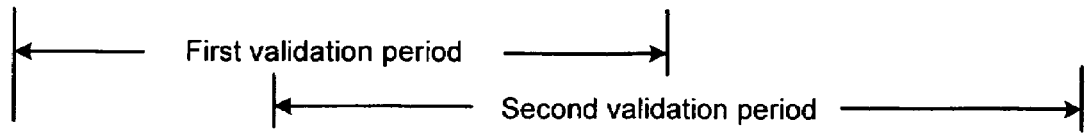
FIG. 17 is a chart showing alternative conditions when implementing an order picking method.

Attention is now drawn to FIG. 17, which shows a chart listing alternative conditions when implementing an exemplary order picking method in accordance with the invention. The first column corresponds to conditions generated as a result of a first RFID interrogation (RFID interrogation # 1). The first RFID interrogation is carried out at the start of the first validation period. The second column corresponds to conditions generated as a result of a second RFID interrogation (RFID interrogation # 2). The second RFID interrogation is carried out at the end of the first validation period, which in this example, corresponds to the start of a second validation period. In a different embodiment, the start of the second validation period does not coincide with the end of the first validation period.

The third column corresponds to conditions generated as a result of a third RFID interrogation (RFID interrogation # 3). The third RFID interrogation is carried out at the end of the second validation period.

In cell 10 of the chart, an RFID Tag 1 responds to RFID interrogation # 1. RFID data, such as the ID code, is retrieved from RFID Tag 1. Subsequent to RFID interrogation # 1, RFID interrogation # 2 elicits one of four responses, three of which that are pertinent to this example are shown in cells 11, 12, and 13.

In cell 11, Tag 1 does not provide any response to RFID interrogation # 2 because the object is not a valid object. This condition may occur when Tag 1 is attached to an object that was momentarily placed on a picking cart and then removed before the end of the validation period. Therefore, the ID code of Tag 1 is not stored in the data base.

In an alternative response, as shown in cell 12, Tag 1 responds to RFID interrogation # 2 thereby indicating a valid read. Consequently, the ID code of Tag 1 is stored in the data base.

In yet another alternative response as shown in cell 13, Tag 1 as well as another tag, Tag 2, responds to RFID interrogation # 2. Because Tag 1 has responded to RFID interrogation # 2, the ID code of Tag 1 is stored in the database. Because Tag 2, which is a new tag, has responded to RFID interrogation # 2, RFID data, such as the ID code, is retrieved from RFID Tag 2. A determination must now be made whether Tag 2 is a valid tag i.e. one attached to a second object placed in the picking cart. This is done by examining a response from Tag 3 to a third RFID interrogation, RFID interrogation # 3, which occurs at the end of the second validation period.

RFID interrogation # 3 may elicit one of four responses after the response shown in cell 13. These four responses are listed in the four cells 14-17. In cell 14, neither Tag 1 nor Tag 2 responds. Consequently, it is concluded that the Tag 2 response to RFID interrogation # 2 was an undesirable response generated for example, by an object located external to the picking cart. The ID code of Tag 2 is not stored in the database because it has been concluded that the object to which Tag 2 is attached is not a pick item. However, the ID code of Tag 1 is retained in the database because it has been already determined in cell 13 that Tag 1 is attached to an object placed in the picking cart. The lack of response from Tag 1 in cell 14 may be attributed to Tag 1 being buried under another object that is yet to be detected.

In cell 15, only Tag 1 responds. In this condition, the ID code of Tag 2 is not stored in the database and the ID code of Tag 1 is retained in the database. In cell 16, only Tag 2 responds thereby indicating that Tag 2 is an RFID tag attached to a second object that has been placed in the picking cart. Therefore, the ID code of Tag 2 is stored in the database. The ID code of Tag 1 is retained in the database because it has been already determined in cell 13 that Tag 1 is attached to a first object placed in the picking cart.

In cell 17, both Tag 1 and Tag 2 respond. The response from Tag 2 indicates that Tag 2 is an RFID tag attached to a second object that has been placed in the picking cart. Therefore, the ID code of Tag 2 is stored in the database. The ID code of Tag 1 is retained in the database because it has been already determined in cell 13 that Tag 1 is attached to a first object placed in the picking cart.

FIG. 18 is another chart showing alternative conditions when implementing various exemplary embodiments of order picking methods in accordance with the invention. Each embodiment is represented as a sequence along a particular row. Furthermore two or more sequences may be combined to produce additional embodiments. Six sequences corresponding to six individual embodiments are shown in FIG. 18. In each embodiment a selected number ("n") of RFID interrogations are performed during any one validation period. Some exemplary conditions that occur as a result of these multiple interrogations and the resulting action taken are shown in the chart.

The first row, corresponding to Sequence # 1 shows each RFID interrogation producing a valid response from Tag 1 during the validation period as well as after the validation period. Consequently, it is concluded that Tag 1 is attached to an object placed in the picking cart and tag data, such as the ID code, that is retrieved from Tag 1 is stored in a database.

The second row, corresponding to Sequence # 2 shows each RFID interrogation producing a valid response from Tag 1 during the entire validation period. However, RFID interrogation # (n+1) elicits no response from Tag 1. Because Tag 1 has responded to all RFID interrogations during the validation period, a conclusion is made that Tag 1 is attached to an object placed in the picking cart. The ID code retrieved from Tag 1 is stored in the database irrespective of the failure of Tag 1 to respond to RFID interrogation # (n+1). Typically, Sequence # 2 will be combined with one or more of the remaining five sequences shown in FIG. 18.

The third row, corresponding to Sequence # 3 shows each RFID interrogation producing a valid response from Tag 1 for all interrogations except RFID interrogation # 3 during the validation period. Furthermore, a valid response is obtained from Tag 1 for RFID interrogation # (n+1), which is outside the validation period. In this exemplary sequence, the ID code of Tag 1 is not stored in the database because of the failure to respond to RFID interrogation # 3. Such a procedure ensures a high degree of reliability in the order picking process of Sequence # 3. It will be understood that RFID interrogation # 3 is used here merely for purposes of description and one or more of the other RFID interrogations inside the validation period may be alternatively used.

The fourth row, corresponding to Sequence # 4 is identical to Sequence # 3 in terms of the responses to RFID interrogation signals inside and outside the validation period. However, the results are interpreted differently. In this embodiment, a majority vote is carried out. The majority vote is based on a predetermined confidence factor that may allow, for example, three non-responses. Because Sequence # 4 passes the majority vote, the ID code of Tag 1 is stored in the database.

The fifth row, corresponding to Sequence # 5 shows each RFID interrogation producing a valid response from Tag 1 for all interrogations during the validation period as well as after the validation period. However, in addition to Tag 1, a second tag—Tag 2, responds to RFID interrogation # 3. Because Tag 1 responded to all interrogations, the ID code of Tag 1 is stored in the database. The ID code of Tag 2 is discarded and not stored in the database because it is determined from the nature of the response (one response among many interrogations) that Tag 2 is attached to an object that appeared momentarily within range of the RFID system. Such a situation may occur when the picking cart is moving past a shelf on which is located Tag 2.

The sixth row, corresponding to Sequence # 6 shows each RFID interrogation producing a valid response from Tag 1 for all interrogations during the validation period as well as after the validation period. However, in addition to Tag 1, a second tag—Tag 2, responds to RFID interrogation # 3. Additionally, a third tag—Tag 3, responds to RFID interrogation # 5. Because Tag 1 responded to all interrogations, the ID code of Tag 1 is stored in the database. The ID codes of Tags 2 and 3 are discarded and not stored in the database because it is determined from the nature of the response (one response each among many interrogations) that Tags 2 and 3 are attached to objects that appeared momentarily within range of the RFID system.

It should be emphasized that the embodiments described above are merely examples of various implementations that have been set forth herein in order to provide a clear understanding of various aspects of the invention. One of ordinary skill in the art will be able to modify these embodiments without substantially departing from the scope of protection defined solely by a proper interpretation of the following claims.

We claim:

1. An order-picking system, comprising:
   a picking cart having a radio frequency (RF) antenna arranged above an object-stacking surface of the picking cart, wherein the RF antenna is a phased array antenna; and
   a radio frequency identification (RFID) tag reader coupled to the RF antenna, the RFID tag reader configured to identify a first RFID tag attached to a first tagged object placed on the picking cart and further configured to eliminate identification of a second RFID tag attached to a second tagged object located outside a perimeter of the object-stacking surface of the picking cart.

2. The order-picking system of claim 1, wherein the second tagged object is located inside a picking area and the phased array antenna is configured to suppress RF coverage of the picking area.

3. The order-picking system of claim 1, wherein the second tagged object is located inside a picking area and the phased array antenna is configured to provide an RF null in the picking area.

4. The order-picking system of claim 1, wherein the phased array antenna is operable to steer an RF null from a first location located outside the perimeter of the object-stacking surface of the picking cart to a second location located outside the perimeter of the object-stacking surface of the picking cart.

5. The order-picking system of claim 1, wherein the phased array antenna is operable to steer RF coverage from a first portion of an object-stacking surface of the picking cart to a second portion of the object-stacking surface of the picking cart.

6. The order-picking system of claim 1, wherein the phased array antenna is operable to provide a first near-field focus on at least a portion of the object-stacking surface of the picking cart.

7. The order-picking system of claim 6, wherein the phased array antenna is further operable to provide a second near-field focus that is located above the object-stacking surface of the picking cart.

8. The order-picking system of claim 1, wherein the phased array antenna is operable to provide RF coverage of a first portion of an object-stacking surface of the picking cart and further configured to suppress RF coverage of a second portion of the object-stacking surface of the picking cart.

9. The order-picking system of claim 1, further comprising:
   a range finder coupled to the RFID tag reader, the range finder configured to measure distance between a radiating surface of the RF antenna and an external surface of the first tagged object placed on the picking cart.

10. The order-picking system of claim 9, wherein the range finder is one of a) a laser range finder, b) an ultrasonic range finder, and c) a radio frequency range finder.

11. The order-picking system of claim 1, further comprising:
a weighing system coupled to the RFID tag reader, the weighing system configured to measure a weight of the first tagged object placed on the picking cart.

12. The order-picking system of claim 11, wherein the weighing system is further configured to measure a differential weight between the first tagged object and a second tagged object placed on the picking cart.

13. The order-picking system of claim 1, further comprising:
a motion detector coupled to the RFID tag reader, the motion detector configured to detect at least one of a forward motion and a reverse motion of the picking cart.

14. The order-picking system of claim 1, wherein the picking cart is one of a) a lift truck, b) a motorized pallet truck, c) a hand pallet truck, d) a shopping cart, e) a trailer, and f) a flatbed.

15. A method for order-picking, the method comprising:
using a phased array antenna for
reading a first radio frequency identification (RFID) tag attached to a first tagged object placed on a picking cart; and
eliminating reading of a second RFID tag attached to a second tagged object located outside a perimeter of an object-stacking surface of the picking cart.

16. The method of claim 15, wherein eliminating reading of the second RFID tag comprises:
configuring a phased array antenna beam pattern to provide radio frequency (RF) coverage at a first location inside the perimeter of the object-stacking surface of the picking cart; and
suppressing RF coverage at a second location outside the perimeter of the object-stacking surface of the picking cart.

17. The method of claim 16, further comprising steering the phased array antenna beam pattern from the first location to a third location inside the perimeter of the object-stacking surface of the picking cart.

18. The method of claim 16, wherein suppressing RF coverage at the second location comprises providing an RF null at the second location.

19. The method of claim 18, further comprising steering the RF null from the second location outside the perimeter of the object-stacking surface of the picking cart to a third location outside the perimeter of the object-stacking surface of the picking cart.

20. The method of claim 15, wherein reading the first RFID tag comprises configuring a phased array antenna beam pattern to provide a near-field focus upon one of a) at least a portion of the object-stacking surface of the stacking cart and b) a location above the object-stacking surface of the stacking cart.

21. The method of claim 15, wherein reading the first RFID tag comprises:
obtaining range information between a radiating surface of the phased array antenna and a top surface of the first tagged object.

22. A method for order-picking using a radio frequency identification (RFID) tag reader mounted on a picking cart, the method comprising:

setting a validation period for validating placement of an object upon the picking cart;
directing a first RFID interrogation signal during the validation period towards an object-stacking surface of the picking cart;
receiving in response thereto, a first RFID code from a first RFID tag;
directing a second RFID interrogation signal during the validation period towards the object-stacking surface of the picking cart;
receiving in response thereto, a second RFID code from a second RFID tag;
identifying the first RFID tag to be same as the second RFID tag upon detecting the first RFID code to be same as the second RFID code;
identifying the first RFID tag to be different than the second RFID tag upon detecting the first RFID code to be different than the second RFID code;
upon identifying the first RFID tag to be same as the second RFID tag, storing one of the first and second RFID codes in an RFID database configured to store at least one RFID code of a picked object placed on the picking cart; and
upon identifying the first RFID tag to be different than the second RFID tag, preventing storage of the first RFID code in the RFID database and further preventing storage of the second RFID code in the RFID database.

23. The method of claim 22, wherein the first RFID interrogation signal is directed towards the object-stacking surface of the picking cart at the start of the validation period and the second RFID interrogation signal is directed towards the object-stacking surface of the picking cart at the end of the validation period.

24. A method for order-picking using a radio frequency identification (RFID) tag reader mounted on a picking cart, the method comprising:
setting a validation period for validating placement of a first object upon the picking cart;
performing during the validation period, a plurality of RFID interrogations directed toward an object-stacking surface of the picking cart;
setting a confidence factor for a plurality of RFID responses generated in response to the plurality of RFID interrogations;
using the confidence factor and the plurality of RFID responses to validate RFID tag data obtained from a first RFID tag attached to the first object;
storing in a database, RFID tag data obtained from the first RFID tag;
performing after the validation period, at least one RFID interrogation directed toward the object-stacking surface of the picking cart; and
retaining in the database, RFID tag data of the first object after the at least one RFID interrogation.

25. The method of claim 24, wherein the first RFID tag is irresponsive to the at least one RFID interrogation.

26. The method of claim 24, wherein RFID tag data is obtained from a second RFID tag attached to a second object during the at least one RFID interrogation.

27. The method of claim 26, wherein the second object is located on top of the first object in the picking cart and wherein the first RFID tag is irresponsive to the at least one RFID interrogation.

28. The method of claim 26, wherein the second object is located external to the picking cart.

29. The method of claim 28, wherein the first RFID tag is responsive to the at least one RFID interrogation.

30. An order-picking program stored on a computer-readable medium, the program comprising:
  logic configured to control a phased array antenna for directing RF radiation towards an object-stacking surface of a picking cart and suppressing RF radiation upon a location outside a perimeter of the object-stacking surface of the picking cart; and
  logic configured to obtain RFID tag information from a first RFID tag attached to a first tagged object that is an item located in the picking cart.

31. The order-picking program of claim 30, wherein logic configured to control the phased array antenna comprises logic configured to steer the RF radiation of the phased array antenna.

32. The order-picking program of claim 30, wherein suppressing RF radiation upon the location outside the perimeter of the object-stacking surface of the picking cart comprises providing a null at the location.

33. The order-picking program of claim 30, wherein logic configured to control the phased array antenna comprises logic configured to change a near-field focus of the RF radiation of the phased array antenna.

34. The order-picking program of claim 33, wherein changing the near-field focus comprises obtaining ranging information.

35. The order-picking program of claim 30, further comprising:
  logic configured to eliminate RFID information obtained from a second RFID tag attached to a second RFID object that is an item not located in the picking cart.

36. A method for order-picking using a radio frequency identification (RFID) tag reader mounted on a picking cart, the method comprising:
  reading a first radio frequency identification (RFID) tag attached to a first tagged object;
  measuring a change in weight imposed upon an object-stacking surface of the picking cart;
  validating the reading of the first RFID tag when the change in weight is equal to a weight gain; and
  storing in a database of the tag reader, upon validating of the reading, first ID data obtained by reading the first RFID tag.

37. The method of claim 36, further comprising:
  invalidating the reading of the first RFID tag when the change in weight is equal to zero.

* * * * *